US012670836B1

(12) United States Patent
Deng

(10) Patent No.: US 12,670,836 B1
(45) Date of Patent: Jun. 30, 2026

(54) DISPLAY PANEL AND DISPLAY DEVICE

(71) Applicant: Guangzhou China Star Optoelectronics Semiconductor Display Technology Co., LTd., Guangzhou (CN)

(72) Inventor: Minghu Deng, Guangzhou (CN)

(73) Assignee: GUANGZHOU CHINA STAR OPTOELECTRONICS SEMICONDUCTOR DISPLAY TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 19/092,833

(22) Filed: Mar. 27, 2025

(30) Foreign Application Priority Data

Dec. 31, 2024 (CN) ........................ 202412000138.8

(51) Int. Cl.
*G09G 3/20* (2006.01)

(52) U.S. Cl.
CPC ... *G09G 3/2092* (2013.01); *G09G 2310/0267* (2013.01); *G09G 2310/08* (2013.01); *G09G 2330/021* (2013.01)

(58) Field of Classification Search
CPC ......... G09G 3/2092; G09G 2310/0267; G09G 2310/08; G09G 2330/021
See application file for complete search history.

(56) References Cited

U.S. PATENT DOCUMENTS

2016/0141352 A1* 5/2016 Sung .................... G09G 3/3233 257/40
2016/0328045 A1* 11/2016 Wang .................. G06F 3/04184
2016/0351152 A1* 12/2016 Dai ....................... H10D 86/423
2017/0092199 A1* 3/2017 Park ...................... G09G 3/3258
2017/0193885 A1* 7/2017 Feng ...................... G11C 19/28
2017/0278450 A1* 9/2017 Ma ........................ G09G 3/3677
2018/0138256 A1* 5/2018 Han ................... H10K 59/1213
2018/0181244 A1* 6/2018 Sato ...................... G09G 3/3677
2019/0304394 A1* 10/2019 Lin ....................... G09G 3/3677
2020/0027415 A1* 1/2020 Chen ..................... G09G 3/3677
2020/0035180 A1* 1/2020 Chen ..................... G09G 3/3677
2020/0075112 A1* 3/2020 Fei .......................... G11C 19/28
2020/0168284 A1* 5/2020 Yu ......................... G06F 3/0412
2020/0219458 A1* 7/2020 Fan .......................... G09G 3/20
(Continued)

FOREIGN PATENT DOCUMENTS

CN 203910231 U 10/2014
CN 105609136 A 5/2016
(Continued)

OTHER PUBLICATIONS

Chinese Office Action issued in corresponding Chinese Patent Application No. 202412000138.8 dated Sep. 20, 2025, pp. 1-8.

*Primary Examiner* — Ryan A Lubit

(74) *Attorney, Agent, or Firm* — PV IP PC; Peter Stecher; Wei Te Chung

(57) ABSTRACT

A display panel and a display device are provided by the embodiments of the present disclosure. The display panel includes a gate driving circuit. A pull-down capacitor is added in the gate driving circuit. At least one of a first node and a second node is electrically connected to a first electrode plate of the pull-down capacitor. A second electrode plate of the pull-down capacitor is electrically connected to a low-potential power supply terminal.

20 Claims, 11 Drawing Sheets

(56) References Cited

U.S. PATENT DOCUMENTS

| | | | | |
|---|---|---|---|---|
| 2020/0357341 | A1* | 11/2020 | Xue | G09G 3/003 |
| 2021/0020089 | A1* | 1/2021 | Huang | G09G 3/3677 |
| 2021/0090518 | A1* | 3/2021 | Yuan | G09G 3/3266 |
| 2021/0280147 | A1* | 9/2021 | Xi | G11C 19/28 |
| 2022/0180816 | A1* | 6/2022 | Yuan | G09G 3/3266 |
| 2024/0046844 | A1* | 2/2024 | Feng | G09G 3/2092 |
| 2024/0054959 | A1* | 2/2024 | Kim | G09G 3/3266 |
| 2024/0169873 | A1* | 5/2024 | Chen | G09G 3/20 |
| 2024/0185936 | A1* | 6/2024 | Qing | G09G 3/36 |
| 2024/0282248 | A1* | 8/2024 | Kim | G09G 3/32 |
| 2024/0355270 | A1* | 10/2024 | Kim | G09G 3/32 |
| 2025/0140204 | A1* | 5/2025 | Jeong | G09G 3/3266 |
| 2025/0239210 | A1* | 7/2025 | Jang | G09G 3/32 |

FOREIGN PATENT DOCUMENTS

| | | | |
|---|---|---|---|
| CN | 106652876 | A | 5/2017 |
| CN | 111816123 | A | 10/2020 |

* cited by examiner (a)

(b)

(a)

(b)

DISPLAY PANEL AND DISPLAY DEVICE

CROSS-REFERENCE TO RELATED APPLICATION

This application claims priority to and the benefit of Chinese Patent Application No. 202412000138.8, filed on Dec. 31, 2024, the disclosure of which is incorporated herein by reference in its entirety.

TECHNICAL FIELD

The present disclosure relates to the technical field of display, and in particular to a display panel and a display device.

BACKGROUND

Gate on array (GOA) technology refers to a driving method in which gate row scanning driving signals are provided on an array substrate to realize row-by-row scanning of gates. Since the GOA technology can be free of gate driving chips and circuit boards, the space occupied by the gate driving chips and the circuit boards is saved, and a narrow bezel is realized, the GOA technology is widely used in display panels. In an existing gate driving circuit, a pull-down maintaining module is used to maintain a pull-down state of an output terminal and a node of the gate driving circuit. Furthermore, in order to improve a pull-down speed of the pull-down maintaining module, channel widths of transistors in the pull-down maintaining module are increased. However, in actual use processes, it is found that since the channel widths of the transistors of the pull-down maintain module are relatively large, the leakage of the transistors of the pull-down maintain module is more serious. Under a case where the node in the gate driving circuit outputs a high potential, the node of the gate driving circuit cannot maintain a high potential due to the influence of leakage, which causes that the gate driving circuit cannot normally output a scanning signal, resulting in abnormal display. On the other hand, if the channel widths of the transistors of the pull-down maintain module are reduced, the pull-down maintain effects of the pull-down maintain module will be poor.

Therefore, the existing gate driving circuit has a technical problem that the pull-down maintaining module cannot take into account low leakage and low potential maintaining capabilities.

SUMMARY

A display panel and a display device are provided by the embodiments of the present disclosure, which can take into account low leakage and low potential maintaining capabilities, so as to at least partially solve the above-described technical problems.

In order to achieve the above-described object, according to a first aspect of the present disclosure, a display panel is provided. The display panel includes a plurality of gate driving circuits in a cascaded configuration. Each of the plurality of cascaded gate driving circuits includes:

a pull-up module electrically connected to a first node, where the pull-up module is configured, according to a potential of the first node, to connect a clock signal line to a signal output terminal of a current stage of gate driving circuit, or to disconnect an electrical connection between the clock signal line and the signal output terminal;

a pull-down maintaining module electrically connected to the first node and a low-potential power supply terminal;

an inverting module, where one end of the inverting module is electrically connected to the first node, the other end of the inverting module is electrically connected to the pull-down maintaining module at a second node, and the inverting module is configured, according to the potential of the first node, for controlling the pull-down maintaining module to connect the low-potential power supply terminal with the first node, or to disconnect an electrical connection between the low-potential power supply terminal and the first node; and a pull-down capacitor, where at least one of the first node and the second node is electrically connected to a first electrode plate of the pull-down capacitor, and a second electrode plate of the pull-down capacitor is electrically connected to the low-potential power supply terminal.

According to a second aspect of the present disclosure, a display device is provided. The display device includes the display panel in any one of the above-described embodiments.

The display panel and the display device are provided by the embodiments of the present disclosure. The display panel includes the gate driving circuits. The pull-down capacitor is disposed in each of the gate driving circuits, so that at least one of the first node and the second node is electrically connected to the first electrode plate of the pull-down capacitor, and the second electrode plate of the pull-down capacitor is electrically connected to the low-potential power supply terminal. The pull-down capacitor is disposed between the low-potential power supply terminal and at least one of the first node and the second node, the capability of maintaining the first node and/or the second node at a low potential can be improved through the pull-down capacitor, and capabilities of maintaining other nodes and the signal output terminal at a low potential can be improved, a pull-down speed can be improved, and capabilities of maintaining the low potential is improved. Furthermore, since the pull-down maintaining capabilities have been increased due to the pull-down capacitor, channel widths of transistors in the pull-down maintaining module and the inverting module can be appropriately reduced, thereby reducing the leakage, and taking into account low leakage and low potential maintaining capabilities of the gate driving circuits.

Other features and advantages of the present disclosure will be described in detail in the detailed description section that follows.

BRIEF DESCRIPTION OF THE DRAWINGS

In order to more clearly explain the technical proposals in the embodiments of the present disclosure, the accompanying drawings necessary for use in the description of the embodiments will be briefly described below. It is evident that the drawings described below are only for some embodiments of the present disclosure, and for those skilled in the art, other drawings can be obtained from these drawings without making creative efforts.

In order to fully understand the present disclosure and beneficial effects thereof, the description will be given below in conjunction with the drawings, and the same reference numbers in the description below indicate the same parts in the drawings.

DETAILED DESCRIPTION

Hereinafter, the technical proposals in the embodiments of the present disclosure will be clearly and completely described with reference to the accompanying drawings in the embodiments of the present disclosure. Obviously, the described embodiments are merely some embodiments of the present disclosure, but not all embodiments. Based on the embodiments in the present disclosure, all other embodiments obtained by those skilled in the art without creative work belong to the scope of protection of the present disclosure.

In the description of the present disclosure, it should be understood that, unless specified or limited otherwise, the terms “connected”, “coupled”, “fixed” and “electrically connected” should be understood in a broad sense, and may be, for example, fixed connections, detachable connections, or integrated connections; may be mechanical connections, may also be electrical connections or communicate with each other; may also be direct connections or indirect connections via intervening structures; may also be inner communications of two elements or interaction relationships between two elements. For those skilled in the art, the specific meanings of these terms in the present disclosure can be understood based on the specific circumstances.

Figure 1:
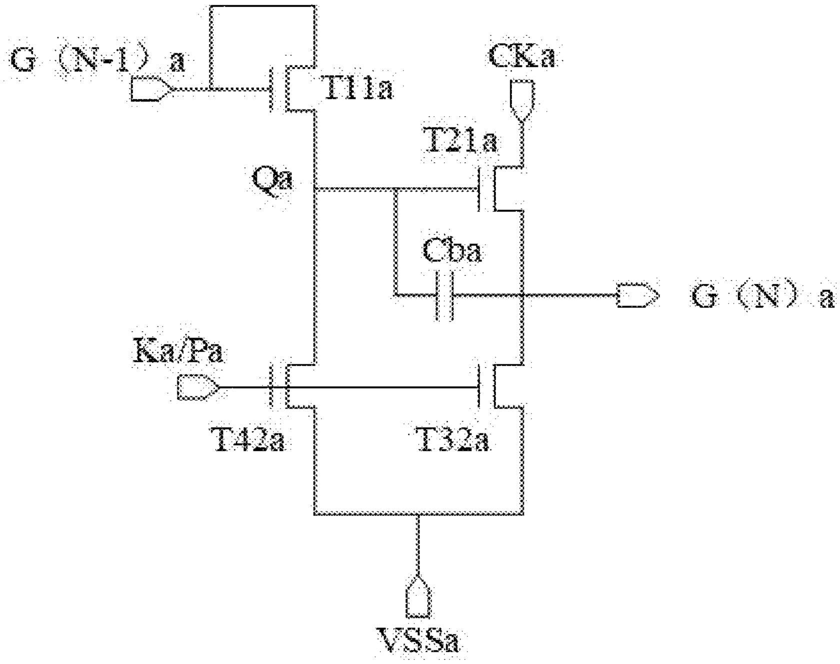
FIG. 1 is a circuit diagram of a gate driving circuit of a comparative display device according to the embodiments of the present disclosure.

In order to explain the principle of the technical problems of the present disclosure, a comparative display device is provided. It can be understood that the comparative display device cannot be regarded as a prior technology in the embodiments of the present disclosure. As shown in FIG. 1, a gate driving circuit in the comparative display device includes a first transistor T11*a*, a second transistor T21*a*, a third transistor T32*a*, a fourth transistor T42*a*, and a capacitor Cba. A gate of the first transistor T11*a* and a first electrode of the first transistor T11*a* are connected to an output terminal G(N−1) a of an upper-stage of gate driving circuit. A second electrode of the first transistor T11*a*, a gate of the second transistor T21*a*, one electrode plate of the capacitor Cba, and a second electrode of the fourth transistor T42*a* are connected to a first node Qa. A first electrode of the second transistor T21*a* is connected to a clock line CKa. A second electrode of the second transistor T21*a*, the other electrode plate of the capacitor Cba, and a second electrode of the third transistor T32*a* are connected to an output terminal G(N)a of a current stage of gate driving circuit. A gate of the third transistor T32*a* and a gate of the fourth transistor T42*a* are connected to a second node Ka or a third node Pa. A first electrode of the third transistor T32*a* and a first electrode of the fourth transistor T42*a* are connected to a low-potential line VSSa. The third transistor T32*a* is used to maintain the output terminal G(N)a at a low potential. The fourth transistor T42*a* is used to maintain the first node Qa at a low potential. Through testing of the gate driving circuit, it was found that the larger channel widths of the third transistor T32*a* and the fourth transistor T42*a*, the better the capabilities to maintain a low potential.

Figure 2:
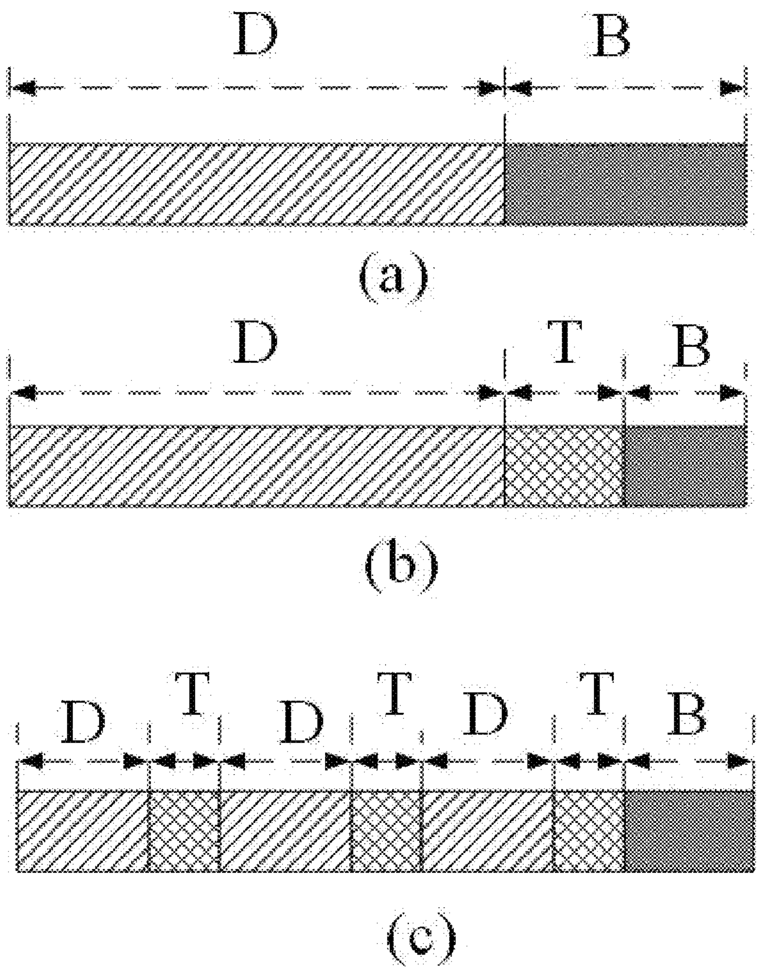
FIG. 2 is a schematic diagram of division of one frame period under different touch modes according to the embodiments of the present disclosure.

Furthermore, in order to realize a touch function of the comparative display device, one frame is divided into a display time period D and a touch time period T. As shown in FIG. 2, (a) in FIG. 2 is a schematic diagram of time division of one frame without touch. As can be seen from (a) in FIG. 2, one frame can be divided into a display time period D and a blank time period B. (b) in FIG. 2 is a schematic diagram of time division of one frame with touch. As can be seen from (b) in FIG. 2, touch will be performed in the blank time period B of one frame. Compared with (a) in FIG. 2, this proposal can be considered to only extend the blank time period B. (c) in FIG. 2 is another schematic diagram of time division of one frame with touch. As can be seen from (c) in FIG. 2, one frame is divided into a plurality of display time periods D and a plurality of touch time periods T. Different touch electrodes are scanned in different time periods, thereby realizing a plurality of point reports in one frame and realizing high-frequency touch.

Figure 3:
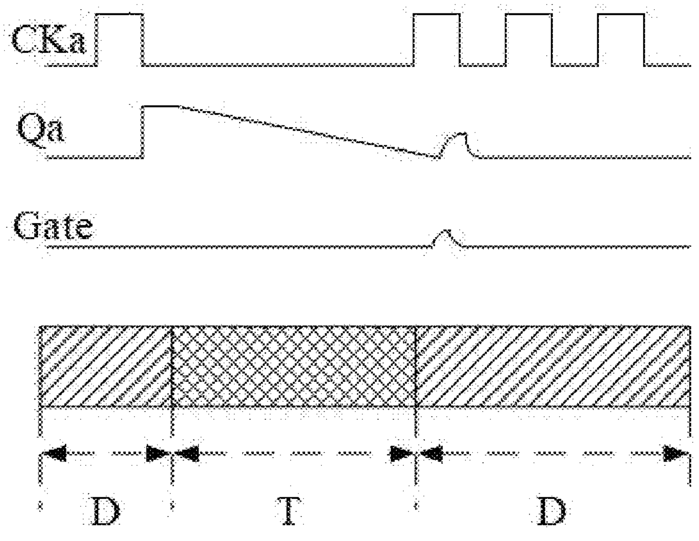
FIG. 3 is a timing diagram of a comparative display device in which a display abnormality occurs when the comparative display device according to the embodiments of the present disclosure adopts one of the touch modes in FIG. 2.

Under a case where the comparative display device adopts the touch mode of (c) in FIG. 2, it can be seen that a relatively long touch time period exists between adjacent two of the display time periods. At this time, the gate driving circuit needs to be suspended. During this period, a potential of the first node Qa needs to be maintained at a high potential. However, in actual use processes, it is found that the first node Qa cannot maintain at a high potential in a high temperature environment. As shown in FIG. 3, it can be seen that the potential of the first node Qa should be maintained at a high potential during the touch time periods T. However, the potential of the first node Qa cannot be maintained at the high potential, resulting in an abnormality of signals output to scanning lines Gate, which may lead to an abnormal display. Through testing of the gate driving circuit, it is found that channel widths of the second transistor T21*a*, the third transistor T32*a*, and the fourth transistor T42*a* are relatively large, resulting in serious leakage. As such, the existing gate driving circuit has a technical problem that the pull-down maintaining module cannot take into account low leakage and low potential maintaining capabilities.

A display panel and a display device are provided by the embodiments of the present disclosure for solving the above-described technical problems.

Figure 4:
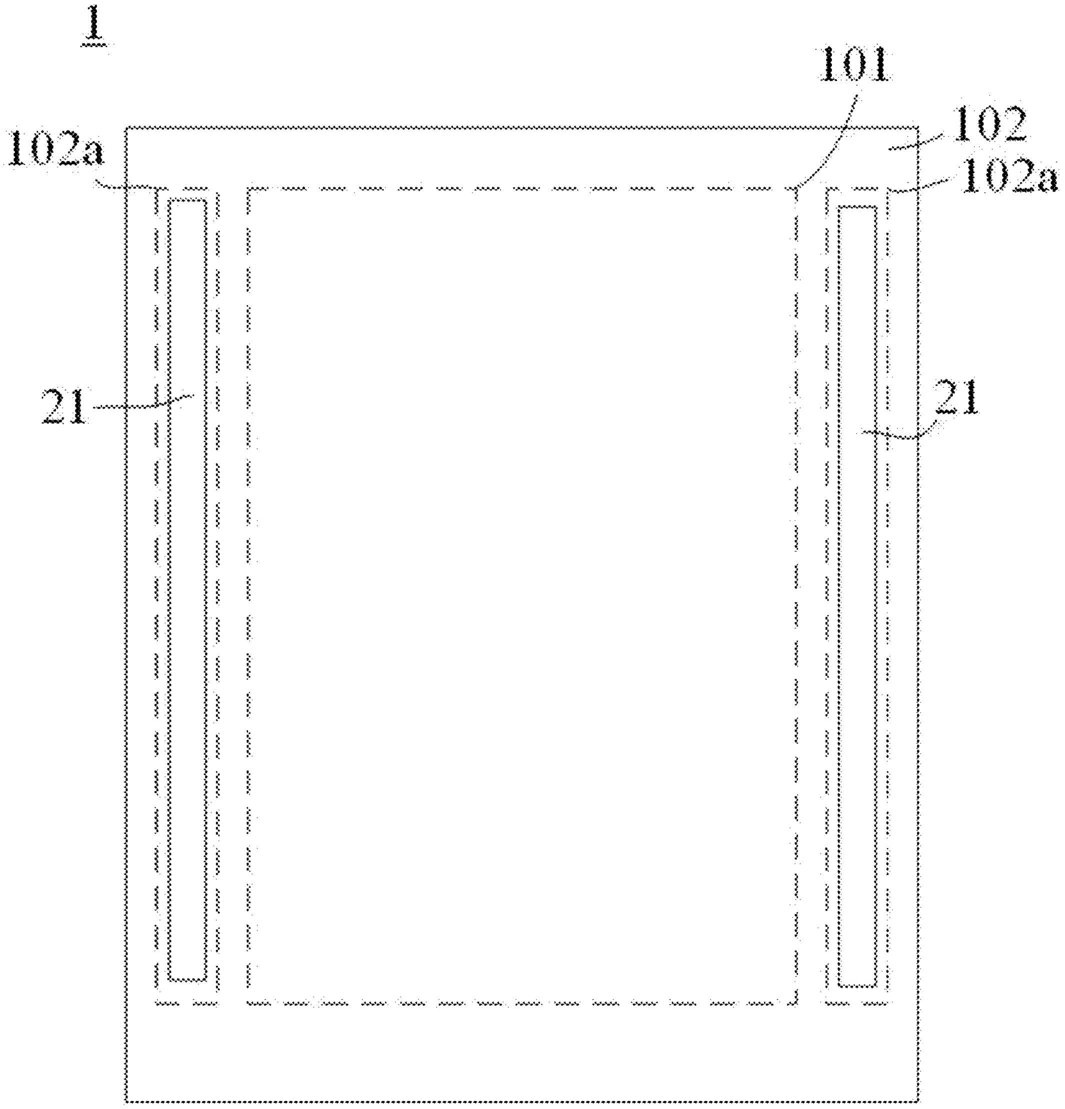
FIG. 4 is a schematic plan view of a display panel according to the embodiments of the present disclosure.
Figure 5:
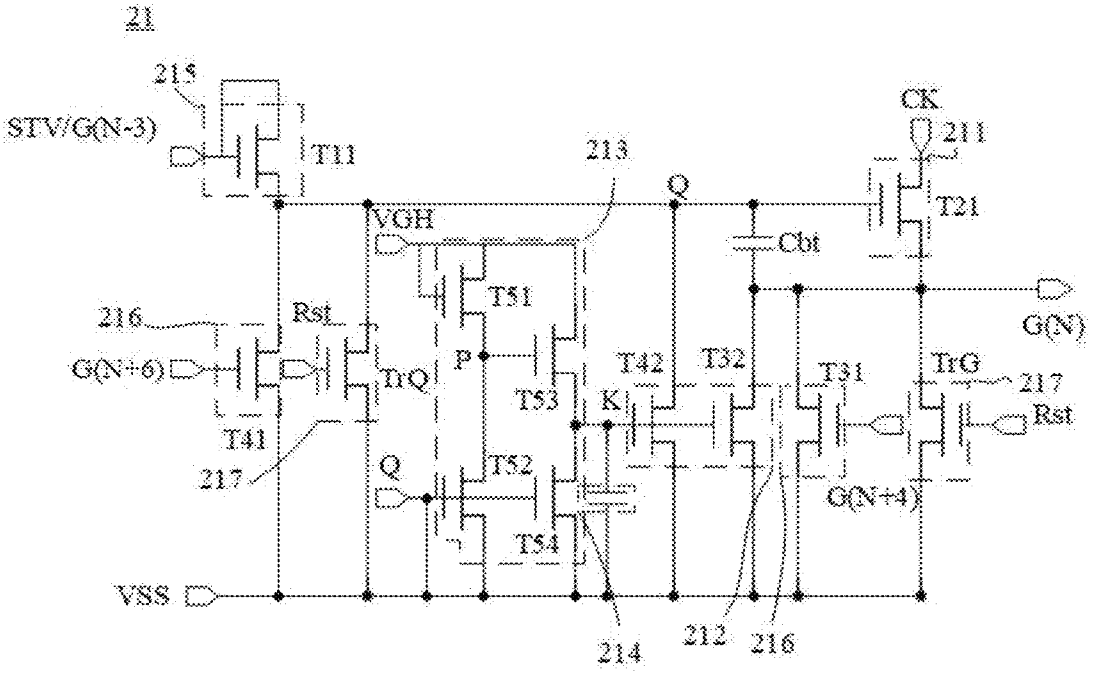
FIG. 5 is a first circuit diagram of a gate driving circuit according to the embodiments of the present disclosure.
Figure 6:
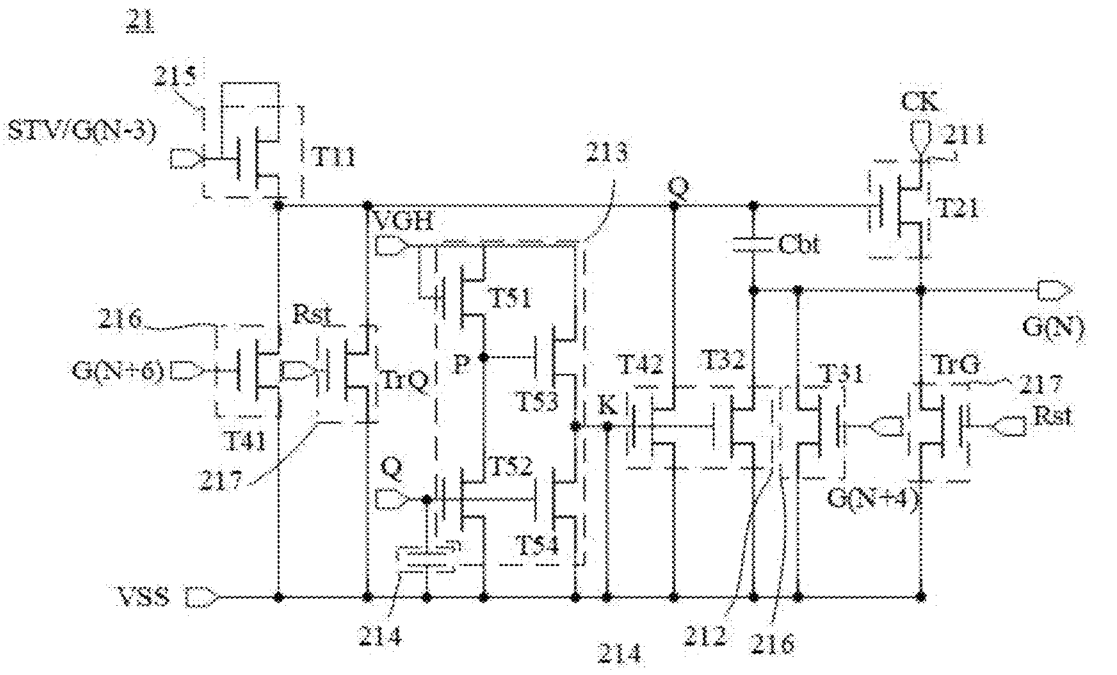
FIG. 6 is a second circuit diagram of a gate driving circuit according to the embodiments of the present disclosure.
Figure 7:
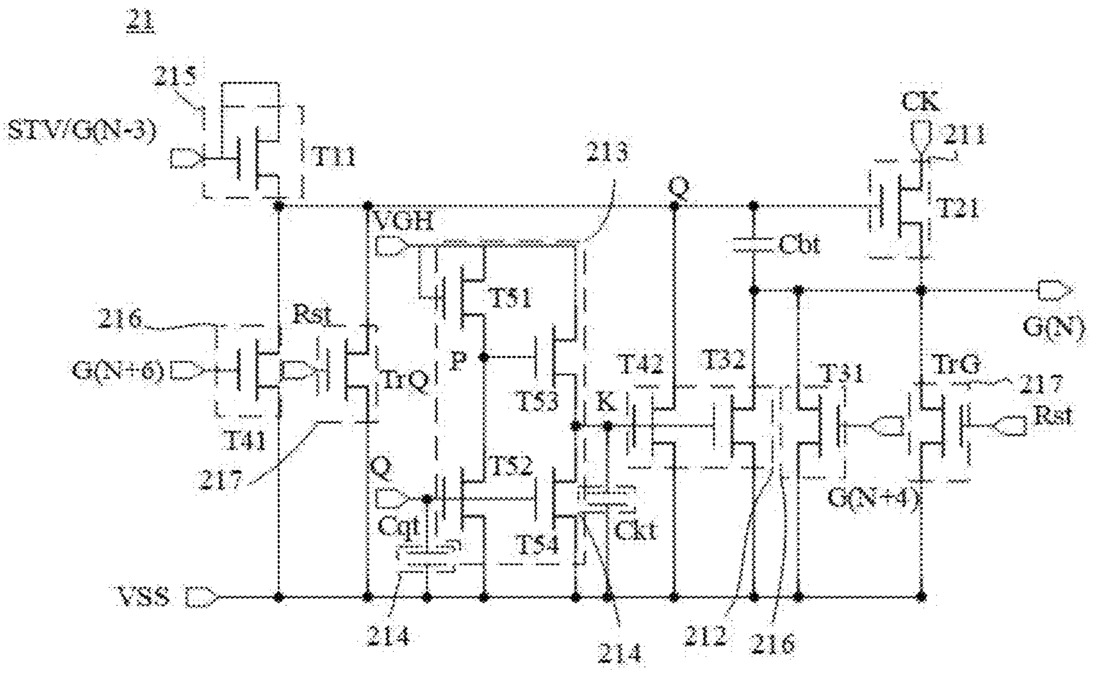
FIG. 7 is a third circuit diagram of a gate driving circuit according to the embodiments of the present disclosure.
Figure 8:
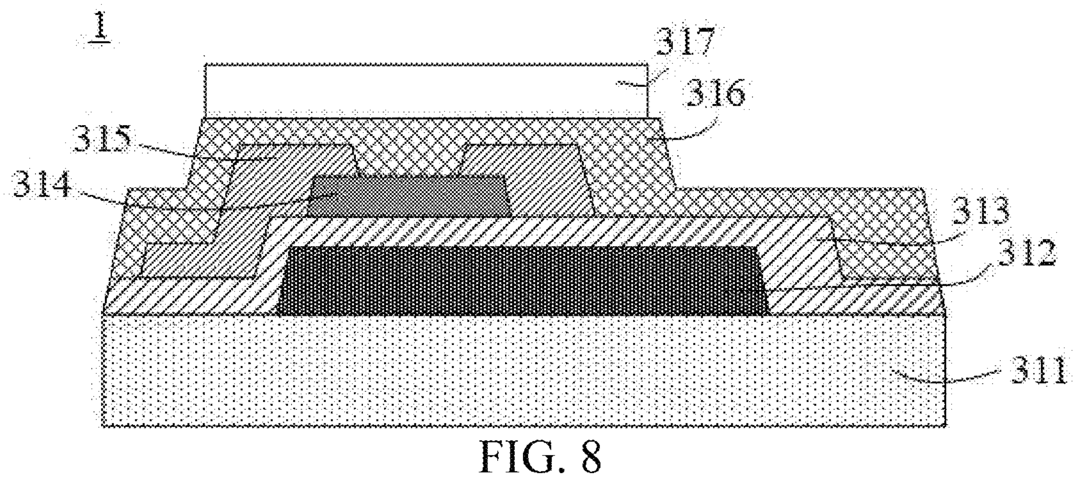
FIG. 8 is a first schematic cross-sectional view of a display panel according to the embodiments of the present disclosure.
Figure 9:
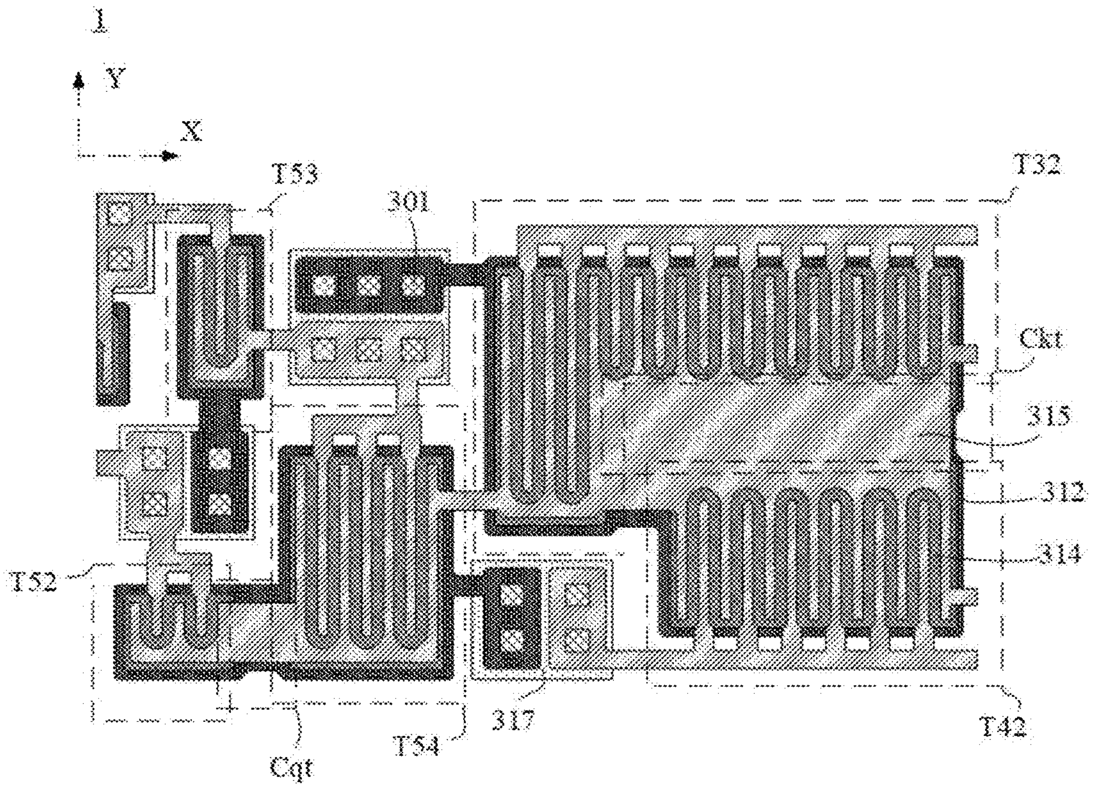
FIG. 9 is a schematic view of a first stacking layer of a display panel according to the embodiments of the present disclosure.
Figure 10:
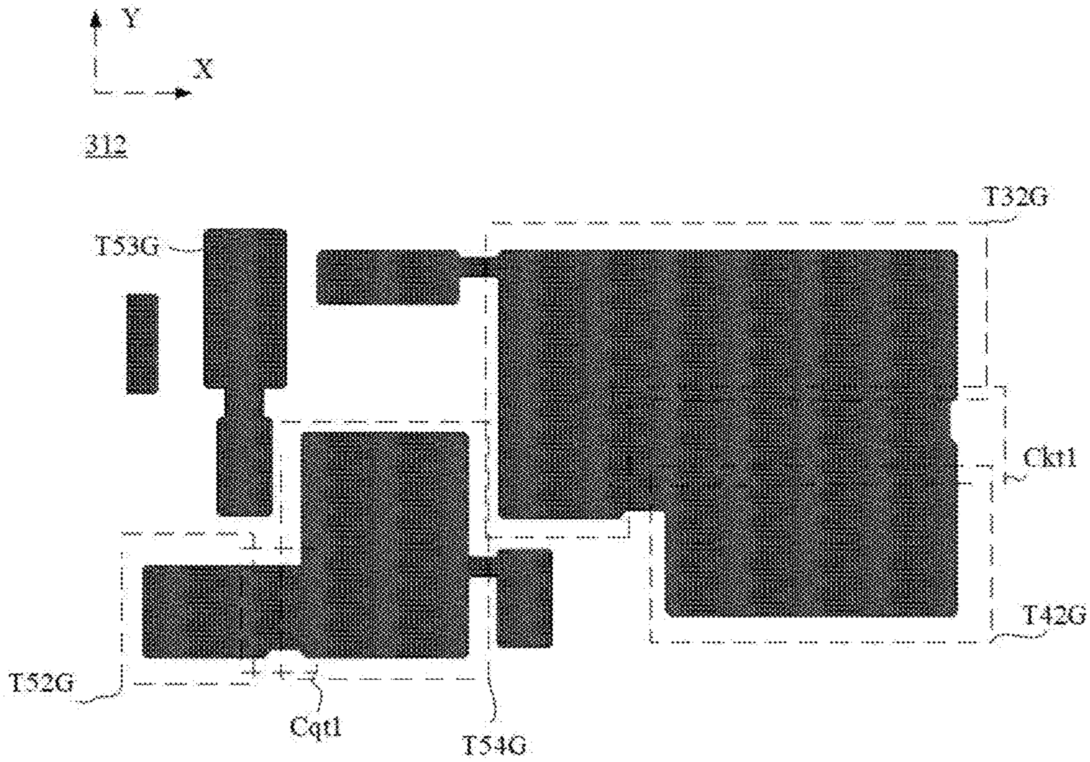
FIG. 10 is an exploded view of a gate layer and an active layer of the display panel in FIG. 9.
Figure 10:
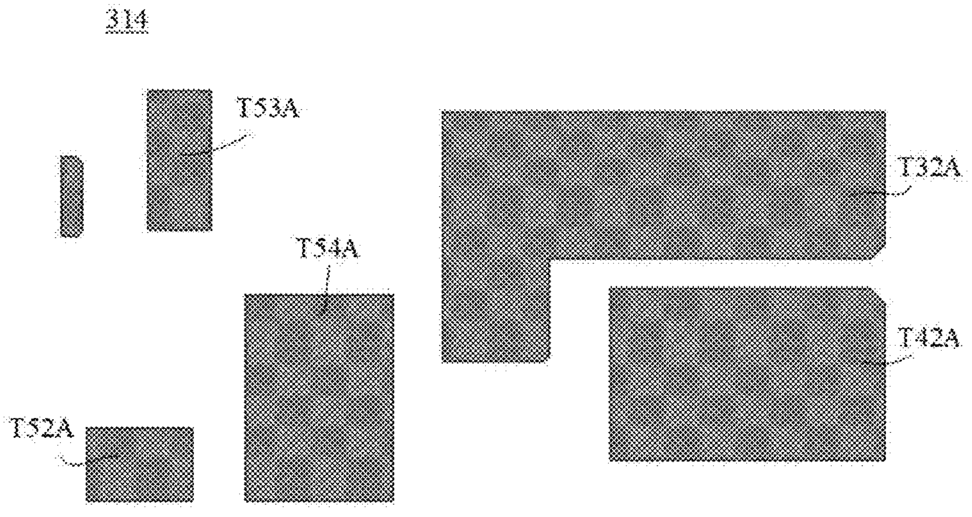
Figure 11:
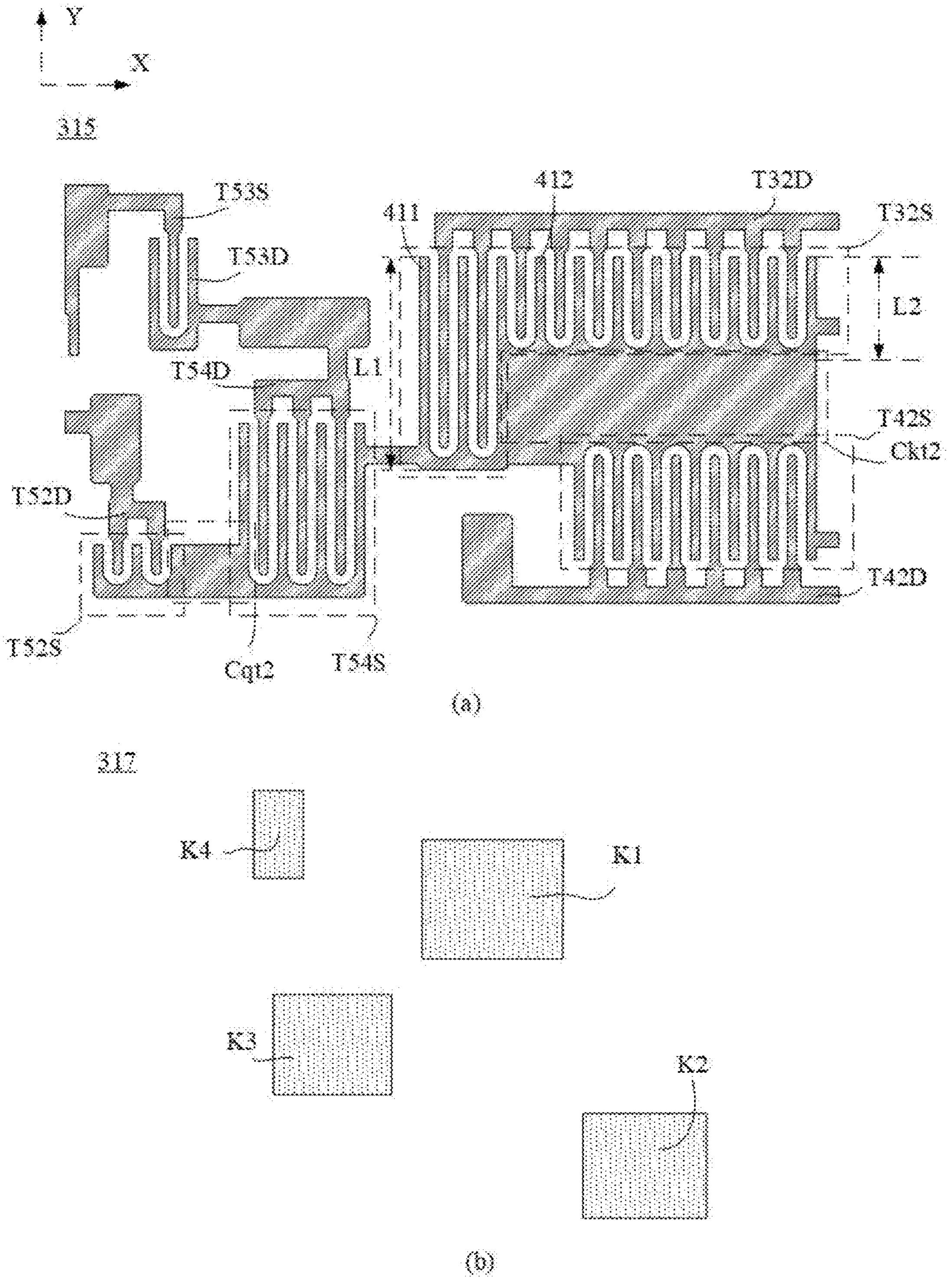
FIG. 11 is an exploded view of a source/drain layer and a pixel conductive layer of the display panel in FIG. 9.
Figure 12:
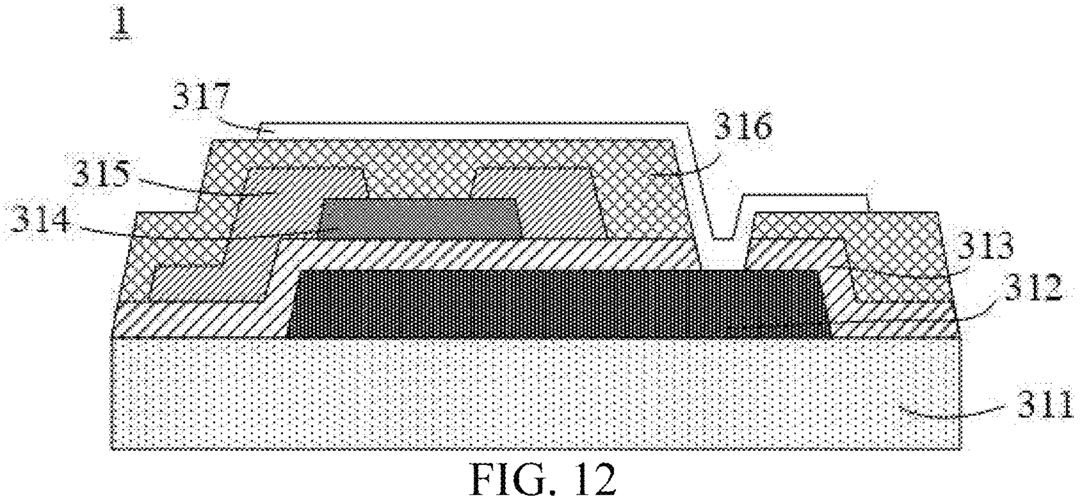
FIG. 12 is a second schematic cross-sectional view of a display panel according to the embodiments of the present disclosure.
Figure 13:
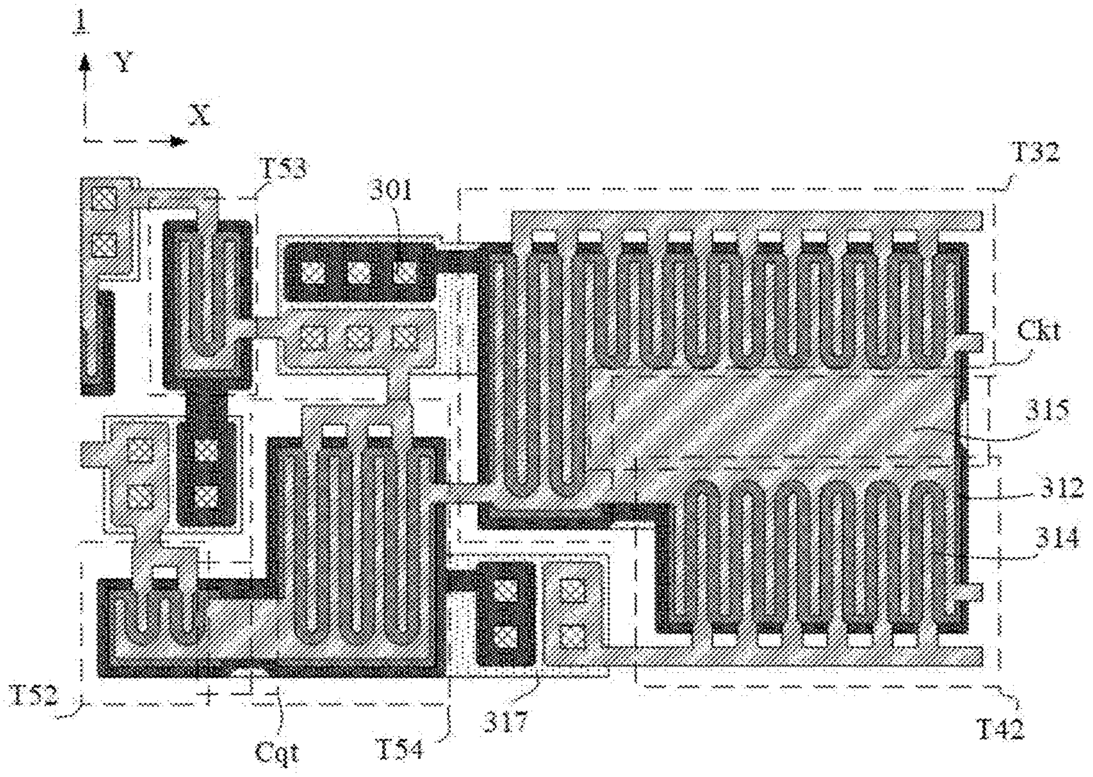
FIG. 13 is a schematic view of a second stacking layer of a display panel according to the embodiments of the present disclosure.
Figure 14:
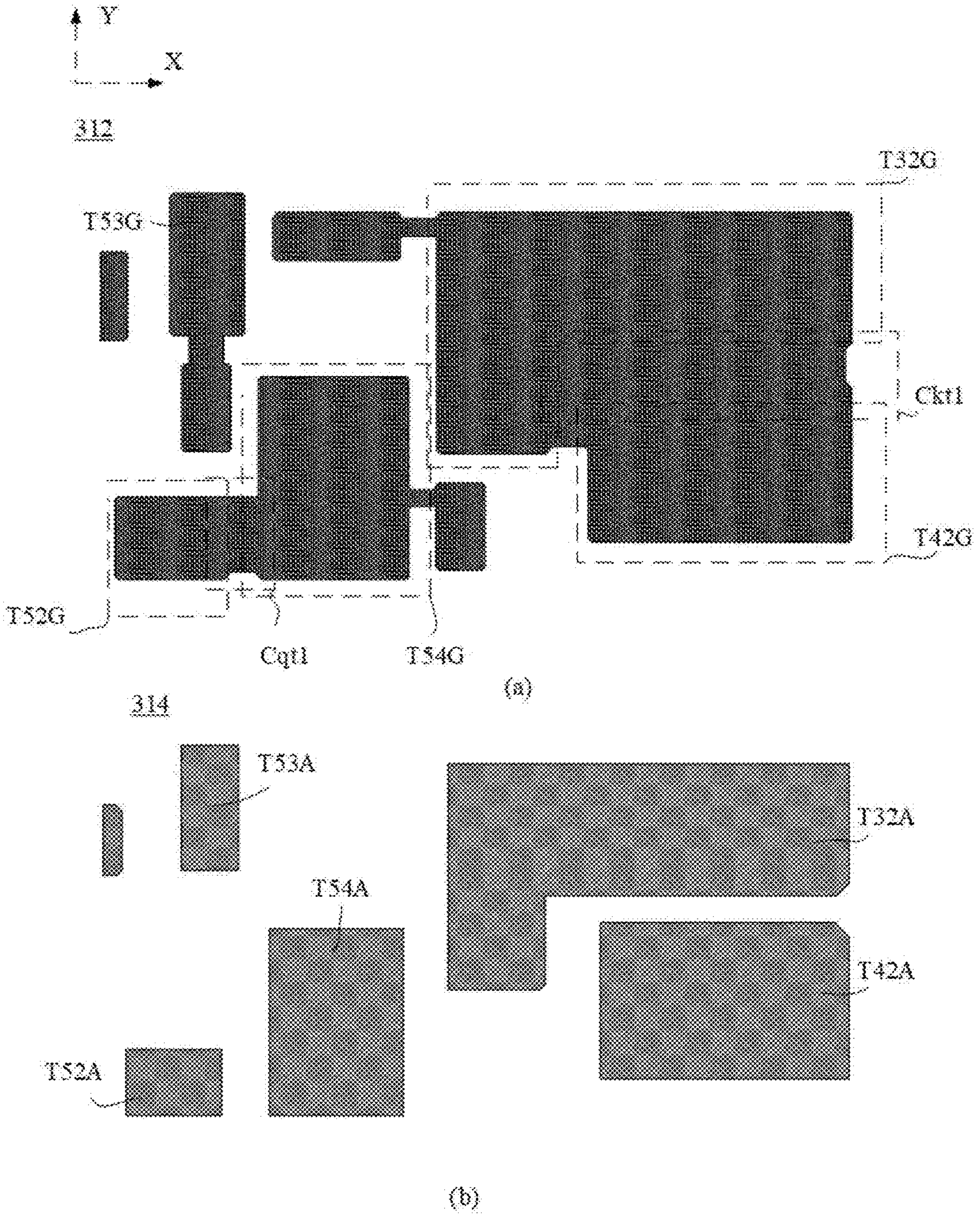
FIG. 14 is an exploded view of a gate layer and an active layer of the display panel in FIG. 13.
Figure 15:
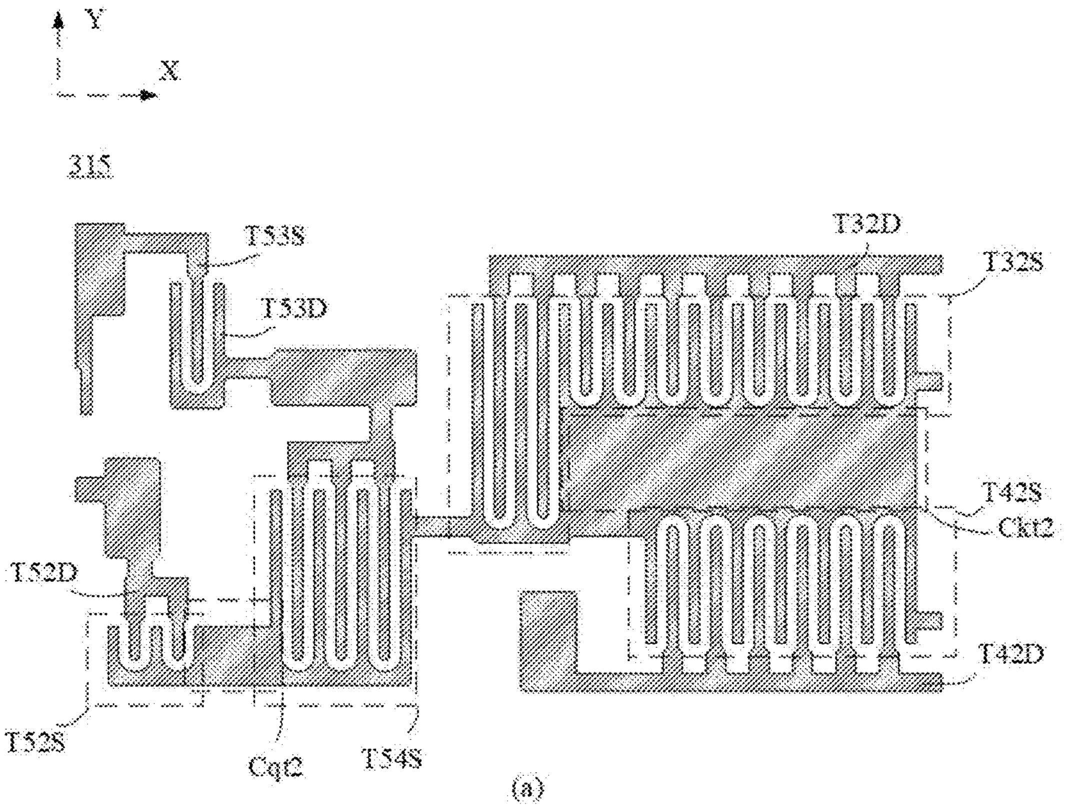
FIG. 15 is an exploded view of a source/drain layer and a pixel conductive layer of the display panel in FIG. 13.
Figure 15:
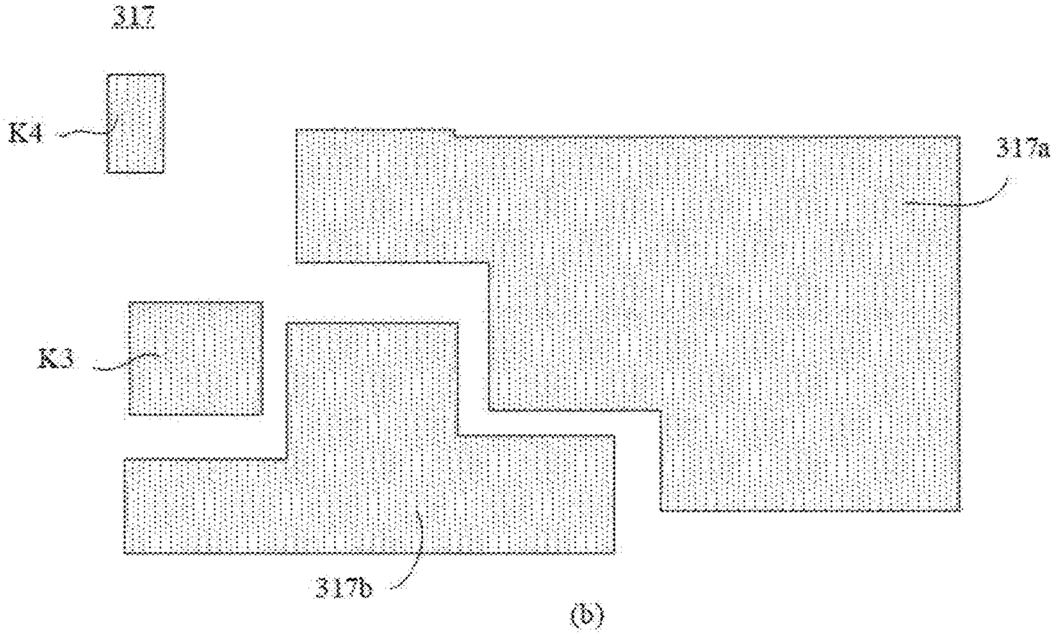

FIG. 4 is a schematic plan view of a display panel according to the embodiments of the present disclosure. FIG. 5 is a first circuit diagram of a gate driving circuit according to the embodiments of the present disclosure. FIG. 6 is a second circuit diagram of a gate driving circuit according to the embodiments of the present disclosure. FIG. 7 is a third circuit diagram of a gate driving circuit according to the embodiments of the present disclosure. FIG. 8 is a first schematic cross-sectional view of a display panel according to the embodiments of the present disclosure. FIG. 9 is a schematic view of a first stacking layer of a display panel according to the embodiments of the present disclosure. FIG. 10 is an exploded view of a gate layer and an active layer of the display panel in FIG. 9. FIG. 11 is an exploded view of a source/drain layer and a pixel conductive layer of the display panel in FIG. 9. FIG. 12 is a second schematic cross-sectional view of a display panel according to the embodiments of the present disclosure. FIG. 13 is a schematic view of a second stacking layer of a display panel according to the embodiments of the present disclosure. FIG. 14 is an exploded view of a gate layer and an active layer of the display panel in FIG. 13. FIG. 15 is an exploded view of a source/drain layer and a pixel conductive layer of the display panel in FIG. 13.

As shown in FIGS. 4 to 15, a display panel is provided by the embodiments of the present disclosure. The display panel 1 includes a plurality of cascaded gate driving circuits 21. Each of the driving circuit includes a pull-up module 211, a pull-down maintaining module 212, and an inverting module 213. The pull-up module 211 is electrically connected to a first node Q. The pull-up module 211 is configured, according to a potential of the first node Q, to connect a clock signal line CK to a signal output terminal G(N) of a current stage of gate driving circuit 21, or to disconnect an electrical connection between the clock signal line CK and the signal output terminal G(N). The pull-down maintaining module 212 is electrically connected to the first node Q and a low-potential power supply terminal VSS. One end of the inverting module 213 is electrically connected to the first node Q, and the other end of the inverting module 213 is electrically connected to the pull-down maintaining module 212 at a second node K. The inverting module 213 is configured, according to the potential of the first node Q, for controlling the pull-down maintaining module 212 to connect the low-potential power supply terminal VSS with the first node Q, or to disconnect an electrical connection between the low-potential power supply terminal VSS and the first node Q.

Each of the gate driving circuits 21 further includes a pull-down capacitor 214. At least one of the first node Q and the second node K is electrically connected to a first electrode plate of the pull-down capacitor 214. A second electrode plate of the pull-down capacitor 214 is electrically connected to the low-potential power supply terminal VSS.

The display panel is provided by the embodiments of the present disclosure. The display panel includes the gate driving circuits. The pull-down capacitor is disposed in each of the gate driving circuits, so that at least one of the first node Q and the second node K is electrically connected to the first electrode plate of the pull-down capacitor, and the second electrode plate of the pull-down capacitor is electrically connected to the low-potential power supply terminal. The pull-down capacitor is disposed between the low-potential power supply terminal and at least one of the first node Q and the second node K, so that the capability of maintaining the first node Q and/or the second node K at a low potential can be improved through the pull-down capacitor, and capabilities of maintaining other nodes and the signal output terminal at a low potential can be improved, a pull-down speed can be improved, and capabilities of maintaining the low potential is improved. Furthermore, since the pull-down maintaining capabilities have been increased due to the pull-down capacitor, channel widths of transistors in the pull-down maintaining module and the inverting module can be appropriately reduced, thereby reducing the leakage, and taking into account low leakage and low potential maintaining capabilities of the gate driving circuits.

Specifically, it can be understood that since a gate overlaps with a source (or a drain) in each transistor, a capacitor will be formed the gate and the source (or the drain). In the embodiments of the present disclosure, through testing, it is found that under a case where the channel width of each transistor in the pull-down maintaining module are larger, the leakage in the high temperature environment is more serious. Under a case where the capacitance of the capacitor formed between the gate and the source (or the drain) of each transistor in the pull-down maintaining module is smaller, the leakage in the high temperature environment is more serious. Furthermore, it is found that the smaller a ratio of the capacitance of the capacitor formed between the gate and the source of each transistor in the pull-up module to a total capacitance (a sum of capacitances in the circuit), the smaller the leakage. As such, it can be known that increasing the channel width of each transistor in the pull-down maintaining module can improve an anti-forward bias ability and accelerate a pull-down speed, while it will cause serious leakage. Increasing the capacitance of the capacitor formed between the gate and the source of each transistor in the pull-down maintaining module can reduce the leakage. Reducing the ratio of the capacitance of the capacitor formed between the gate and the source of each transistor in the pull-up module to the total capacitance (the sum of the capacitances in the circuit) can reduce leakage. However, in the related technology, since each transistor is independently arranged, reducing the channel width of each transistor will reduce the capacitance formed between the gate and the source of each transistor. As such, in the embodiments of the present disclosure, at least one pull-down capacitor are disposed, and the pull-down capacitor is distinguished from the capacitance formed between the gate and the source of each transistor, so that the capacitance of the pull-down capacitor and the channel width of each transistor can be independently designed, and the pull-down speed can be accelerated and the performance of maintaining low potential can be achieved through the pull-down capacitor. The channel width of each transistor is adjusted to reduce the leakage, thereby taking into account the low leakage and low potential maintenance capabilities of the gate driving circuit.

Specifically, it can be understood that in the embodiments of the present disclosure, the pull-down capacitor added and the capacitor formed between the gate and the source of each transistor can be regarded as being connected in series. When the two capacitors are regarded as a whole, it is equivalent to increasing the capacitor formed between the gate and the source of each transistor. Furthermore, since a size of the pull-down capacitor can be adjusted, the capacitor formed between the gate and the source of each transistor can be designed independently from the channel width of each transistor. The capacitor and the channel width can be designed independently, thereby taking into account the relatively small channel width and relatively large capacitance, and taking into account the low leakage and low potential maintenance capabilities of the gate driving circuit.

Specifically, as shown in FIG. 4, a non-display region 102 may be provided surrounding the display region 101, but the embodiments of the present disclosure are not limited thereto. The non-display region 102 may be provided on two sides or three sides of the display region 101. The non-display region 102 may be bent to a back side of the display panel. The non-display region 102 may include a gate driving circuit region 102*a* located on two sides of the display region 101, and the gate driving circuits may be disposed in the gate driving circuit region, but the embodiments of the present disclosure are not limited thereto. The gate driving circuit region may be provided on one side of the display region, and accordingly, the gate driving circuits are arranged on one side of the display region.

Specifically, the non-display region 102 may further include a bonding region (not shown).

In some embodiments, as shown in FIG. 5, the first electrode plate of the pull-down capacitor 214 is electrically connected to the second node K, and the second electrode plate of the pull-down capacitor 214 is electrically connected to the low-potential power supply terminal VSS. The first electrode plate of the pull-down capacitor is electrically connected to the second node K, and the second electrode plate of the pull-down capacitor is electrically connected to the low-potential power supply terminal, so that a pull-down speed of the first node Q and the signal output terminal can be accelerated through the pull-down capacitor. Accordingly, the channel width of each transistor in the pull-down maintaining module can be reduced, the risk of leakage can be reduced, and the high-potential stability of the first node Q and the signal output terminal can be improved.

In some embodiments, as shown in FIG. 6, the first electrode plate of the pull-down capacitor 214 is electrically connected to the first node Q, and the second electrode plate of the pull-down capacitor 214 is electrically connected to the low-potential power supply terminal VSS. The first electrode plate of the pull-down capacitor is electrically connected to the first node Q, and the second electrode plate of the pull-down capacitor is electrically connected to the low-potential power supply terminal, so that a pull-down speed of the second node K and a third node can be accelerated through the pull-down capacitor. Accordingly, the channel width of each transistor in the inverting module can be reduced, and the high potential stability of the second node K and the third node can be improved.

Specifically, considering that the inverting module is connected to the pull-down maintaining module, the stability of the inverting module may directly affect the stability of the pull-down maintaining module, thereby indirectly affecting the display effect. As such, in the embodiments of the present disclosure, the first electrode plate of the pull-down capacitor is electrically connected to the first node Q, and the second electrode plate of the pull-down capacitor is electrically connected to the low-potential power supply terminal, so that the pull-down speed of the second node K and the third node can be accelerated through the pull-down capacitor, and the capabilities of the inverting module to maintain the low potential can be improved. Furthermore, accordingly, the channel width of each transistor in the inverting module can be reduced, and the leakage is reduced, thereby avoiding display abnormality.

In some embodiments, as shown in FIG. 7, the pull-down capacitor 214 includes a first sub-capacitor Cqt and a second sub-capacitor Ckt. A first electrode plate of the first sub-capacitor Cqt is electrically connected to the first node Q. A second electrode plate of the first sub-capacitor Cqt is electrically connected to the low-potential power supply terminal VSS. A first electrode plate of the second sub-capacitor Ckt is electrically connected to the second node K. A second electrode plate of the second sub-capacitor Ckt is electrically connected to the low-potential power supply terminal VSS. The first electrode plate of the first sub-capacitor Cqt is electrically connected to the first node Q, and the second electrode plate of the first sub-capacitor Cqt is electrically connected to the low-potential power supply terminal VSS, so that the pull-down speed of the second node K and the third node can be accelerated through the first sub-capacitor Cqt. Accordingly, the channel width of each transistor in the inverting module can be reduced, and the high potential stability of the second node K and the third node can be improved. The first electrode plate of the second sub-capacitor Ckt is electrically connected to the second node K, and the second electrode plate of the second sub-capacitor Ckt is electrically connected to the low-potential power supply terminal VSS, so that the pull-down speed of the first node Q and the signal output terminal can be accelerated through the second sub-capacitor Ckt. Accordingly, the channel width of each transistor in the pull-down maintaining module can be reduced, the risk of leakage can be reduced, and the high-potential stability of the first node Q and the signal output terminal can be improved.

In some embodiments, as shown in FIGS. 5 to 7, the pull-down maintaining module 212 includes a first pull-down maintaining transistor T32 and a second pull-down maintaining transistor T42. Agate of the first pull-down maintaining transistor T32 is electrically connected to the second node K. A first electrode of the first pull-down maintaining transistor T32 is electrically connected to the low-potential power supply terminal VSS. A second electrode of the first pull-down maintaining transistor T32 is electrically connected to the signal output terminal G(N). A gate of the second pull-down maintaining transistor T42 is electrically connected to the second node K. A first electrode of the second pull-down maintaining transistor T42 is electrically connected to the low-potential power supply terminal VSS. A second electrode of the second pull-down maintaining transistor T42 is electrically connected to the first node Q.

The first electrode plate of the second sub-capacitor Ckt is electrically connected to the gate of the first pull-down maintaining transistor T32 and the gate of the second pull-down maintaining transistor T42. The first pull-down maintaining transistor T32 and the second pull-down maintaining transistor T42 are disposed, so that the second electrode of the first pull-down maintaining transistor T32 is connected to the signal output terminal, and the second electrode of the second pull-down maintaining transistor T42 is connected to the first node Q. Thus the signal output terminal and the first node Q can be maintained at a low potential through the first pull-down maintaining transistor T32 and the second pull-down maintaining transistor T42, so that the gate driving circuit can operate normally. Furthermore, the first electrode plate of the second sub-capacitor Ckt is electrically connected to the gate of the first pull-down maintaining transistor T32 and the gate of the second pull-down maintaining transistor T42, so that the pull-down speed of the first node Q and the signal output terminal can be accelerated. Accordingly, the channel widths of the first pull-down maintaining transistor T32 and the second pull-down maintaining transistor T42 can be reduced, thereby reducing leakage and taking into account the low leakage and low potential maintenance capabilities of the gate driving circuit.

In some embodiments, as shown in FIGS. 5 to 7, the inverting module 213 includes a first inverting transistor T51, a second inverting transistor T52, a third inverting transistor T53, and a fourth inverting transistor T54. A gate of the first inverting transistor T51 is electrically connected to a high-potential power supply terminal VGH. A first electrode of the first inverting transistor T51 is electrically connected to the high-potential power supply terminal VGH. A gate of the second inverting transistor T52 is electrically connected to the first node Q. A first electrode of the second inverting transistor T52 is electrically connected to the low-potential power supply terminal VSS. A second electrode of the second inverting transistor T52 is electrically connected to a second electrode of the first inverting transistor T51 at the third node P. A gate of the third inverting transistor T53 is electrically connected to the second electrode of the first inverting transistor T51 at the third node P. A first electrode of the third inverting transistor T53 is electrically connected to the high-potential power supply terminal VGH. A second electrode of the third inverting transistor T53 is electrically connected to the pull-down maintaining module 212 at the second node K. A gate of the fourth inverting transistor T54 is electrically connected to the first node Q. A first electrode of the fourth inverting transistor T54 is electrically connected to the low-potential power supply terminal VSS. A second electrode of the fourth inverting transistor T54 is electrically connected to the second node K.

The first electrode plate of the first sub-capacitor Cqt is electrically connected to the gate of the second inverting transistor T52 and the gate of the fourth inverting transistor T54. The first electrode plate of the first sub-capacitor Cqt is electrically connected to the gate of the second inverting transistor T52 and the gate of the fourth inverting transistor T54, so that the pull-down speed of the second node K and the third node can be accelerated. Accordingly, the channel widths of the second inverting transistor T52 and the fourth inverting transistor T54 can be reduced, thereby reducing leakage and taking into account the low leakage and low potential maintenance capabilities of the gate driving circuit.

In some embodiments, as shown in FIGS. 7 to 15, the display panel 1 includes a substrate 311, a gate layer 312, and a source/drain layer 315. The gate layer 312 is disposed on a side of the substrate 311. The gate layer 312 includes the gate T32G of the first pull-down maintaining transistor T32, the gate T42G of the second pull-down maintaining transistor T42, the gate T52G of the second inverting transistor T52, the gate T54G of the fourth inverting transistor T54, the first electrode plate Cqt1 of the first sub-capacitor Cqt, and the first electrode plate Ckt1 of the second sub-capacitor Ckt. The source/drain layer 315 is disposed on a side of the gate layer 312 away from the substrate 311. The source/drain layer 315 includes the first electrode T32S of the first pull-down maintaining transistor T32, the first electrode T42S of the second pull-down maintaining transistor T42, the first electrode T52S of the second inverting transistor T52, the first electrode T54S of the fourth inverting transistor T54, the second electrode plate Cqt2 of the first sub-capacitor Cqt, and the second electrode plate Ckt2 of the second sub-capacitor Ckt.

The gate T32G of the first pull-down maintaining transistor T32 and the gate T42G of the second pull-down maintaining transistor T42 are connected to the first electrode plate Ckt1 of the second sub-capacitor Ckt. The first electrode T32S of the first pull-down maintaining transistor T32 and the first electrode T42S of the second pull-down maintaining transistor T42 are connected to the second electrode plate Ckt2 of the second sub-capacitor Ckt.

And/or, the gate T52G of the second inverting transistor T52 and the gate T54G of the fourth inverting transistor T54 are connected to the first electrode plate Cqt1 of the first sub-capacitor Cqt, and the first electrode T52S of the second inverting transistor T52 and the first electrode T54S of the fourth inverting transistor T54 are connected to the second electrode plate Cqt2 of the first sub-capacitor Cqt.

In some embodiments, only the gate T32G of the first pull-down maintaining transistor T32 and the gate T42G of the second pull-down maintaining transistor T42 are connected to the first electrode plate Ckt1 of the second sub-capacitor Ckt, and the first electrode T32S of the first pull-down maintaining transistor T32 and the first electrode T42S of the second pull-down maintaining transistor T42 are connected to the second electrode plate Ckt2 of the second sub-capacitor Ckt. Thus when the second sub-capacitor Ckt is added, the gate of the first pull-down maintaining transistor T32, the gate of the second pull-down maintaining transistor T42, and the first electrode plate of the second sub-capacitor Ckt can be combined, and the first electrode of the first pull-down maintaining transistor T32, the first electrode of the second pull-down maintaining transistor T42, and the second electrode plate of the second sub-capacitor Ckt can be combined, thereby improving a space utilization and reducing the bezel while the second sub-capacitor Ckt is added. The design of the second inverting transistor T52, the fourth inverting transistor T54, and the first sub-capacitor Cqt is not limited.

In some embodiments, only the gate T52G of the second inverting transistor T52 and the gate T54G of the fourth inverting transistor T54 are connected to the first electrode plate Cqt1 of the first sub-capacitor Cqt, and the first electrode T52S of the second inverting transistor T52 and the first electrode T54S of the fourth inverting transistor T54 are connected to the second electrode plate Cqt2 of the first sub-capacitor Cqt. As such, when the first sub-capacitor Cqt is added, the gate T52G of the second inverting transistor T52, the gate T54G of the fourth inverting transistor T54, and the first electrode plate Cqt1 of the first sub-capacitor Cqt can be combined, and the first electrode of the second inverting transistor T52, the first electrode of the fourth inverting transistor T54, and the second electrode plate of the first sub-capacitor Cqt can be combined, thereby improving the space utilization and reducing the bezel while the first sub-capacitor Cqt is added. The design of the first pull-down maintaining transistor T32, the second pull-down maintaining transistor T42, and the second sub-capacitor Ckt is not limited.

In some embodiments, the gate T32G of the first pull-down maintaining transistor T32 and the gate T42G of the second pull-down maintaining transistor T42 are connected to the first electrode plate Ckt1 of the second sub-capacitor Ckt, and the first electrode T32S of the first pull-down maintaining transistor T32 and the first electrode T42S of the second pull-down maintaining transistor T42 are connected to the second electrode plate Ckt2 of the second sub-capacitor Ckt. Furthermore, the gate T52G of the second inverting transistor T52 and the gate T54G of the fourth inverting transistor T54 are connected to the first electrode plate Cqt1 of the first sub-capacitor Cqt, and the first electrode T52S of the second inverting transistor T52 and the first electrode T54S of the fourth inverting transistor T54 are connected to the second electrode plate Cqt2 of the first sub-capacitor Cqt. As such, when the first sub-capacitor Cqt and the second sub-capacitor Ckt are added, the gate of the first pull-down maintaining transistor T32, the gate of the second pull-down maintaining transistor T42, and the first electrode plate of the second sub-capacitor Ckt can be combined, the gate of the second inverting transistor T52, the gate of the fourth inverting transistor T54, and the first electrode plate of the first sub-capacitor Cqt can be combined, the gate of the first pull-down maintaining transistor T32, the first electrode of the second pull-down maintaining transistor T42, and the second electrode plate of the second sub-capacitor Ckt can be combined, and the first electrode of the second pull-down maintaining transistor T52, the first electrode of the fourth pull-down maintaining transistor T54, and the second electrode plate of the first sub-capacitor Cqt can be combined. Thus the space utilization is improved and the bezel is reduced, while the first sub-capacitor Cqt and the second sub-capacitor Ckt are added.

Specifically, as shown in FIG. 8 and FIG. 12, the display panel 1 further includes a gate insulating layer 313, an active layer 314, an interlayer insulating layer 316, and a pixel conductive layer 317. The gate insulating layer 313 may be disposed on a side of the gate layer 312 away from the substrate 311. The active layer 314 is disposed between the gate insulating layer 313 and the source/drain layer 315. The interlayer insulating layer 316 is disposed on a side of the source/drain layer 315 away from the active layer. The pixel conductive layer 317 is disposed on a side of the interlayer insulating layer 316 away from the source/drain layer 315.

In some embodiments, as shown in FIGS. 8 to 15, the first electrode T32S of the first pull-down maintaining transistor T32 includes a first branch electrode 411 and a second branch electrode 412. The first branch electrode 411 and the second branch electrode 412 are arranged along a first direction X. A length L1 of the first branch electrode 411 along a second direction Y is greater than a length L2 of the second branch electrode 412 along the second direction Y. The second electrode plate Ckt2 of the second sub-capacitor Ckt and a part of the first branch electrode 411 extending beyond the second branch electrode 412 are arranged along the first direction X.

In the second direction, the second electrode plate Ckt2 of the second sub-capacitor Ckt is located between the second branch electrode 412 and the first electrode T42S of the second pull-down maintaining transistor T42. An included angle between the first direction X and the second direction Y is greater than 0 degrees and less than or equal to 90 degrees. The first electrode of the first pull-down maintaining transistor T32 includes the first branch electrode and the second branch electrode, the length of the first branch electrode is greater than the length of the second branch electrode, the second electrode plate of the second sub-capacitor Ckt and the part of the first branch electrode extending beyond the second branch electrode are arranged along the first direction, and the second electrode plate of the second sub-capacitor Ckt is located between the second branch electrode and the first electrode of the second pull-down maintaining transistor T42, so that the part of the second branch electrode of the first electrode of the first pull-down maintaining transistor T32 can be shortened, and this part can be used as the second electrode plate of the second sub-capacitor Ckt. As such, the second sub-capacitor Ckt is added while the channel width of the transistor is reduced. That is, the space utilization rate can be improved and the bezel can be reduced while the electricity of the display panel is improved.

Specifically, it can be seen that a connection between the gate of the fourth inverting transistor T54 and the second electrode of the second pull-down maintaining transistor T42 (i.e., the first node Q) is disposed correspondingly to the first branch electrode, and the first electrode of the second pull-down maintaining transistor T42 is disposed correspondingly to the second branch electrode. Furthermore, the connection between the gate of the fourth inverting transistor T54 and the second electrode of the second pull-down maintaining transistor T42 is disposed along the first direction with the first electrode of the second pull-down maintaining transistor T42, thereby improving the space utilization ratio, the channel width of the second pull-down maintaining transistor T42 can be appropriately reduced, and the space utilization is increased and the bezel is reduced while the electrical performance of the display panel is improved.

In some embodiments, as shown in FIGS. 8 to 15, the second electrode plate Cqt2 of the first sub-capacitor Cqt is located between the first electrode T52S of the second inverting transistor T52 and the first electrode T54S of the fourth inverting transistor T54. The second electrode plate of the first sub-capacitor Cqt is located between the first electrode of the second inverting transistor T52 and the first electrode of the fourth inverting transistor T54, so that the second electrode plate of the first sub-capacitor Cqt can be formed by using a gap between the first electrode of the second inverting transistor T52 and the first electrode of the fourth inverting transistor T54, thereby improving the space utilization rate and reducing the bezel, while improving the electrical performance of the display panel.

Specifically, it can be seen that in the second direction, a length of the first electrode of the fourth inverting transistor T54 is greater than a length of the first electrode of the second inverting transistor T52. A connection between the second electrode of the second inverting transistor T52 and the gate of the third inverting transistor (i.e., the third node P) and a part of the first electrode of the fourth inverting transistor T54 extending beyond the first electrode of the second inverting transistor T52 are arranged correspondingly, thereby improving the space utilization rate and reducing the bezel.

Specifically, it can be understood that compared to the design where each transistor is independently provided, in the embodiments of the present disclosure, when the pull-down capacitor is added, the connection relationship and position of each transistor are adjusted, thereby improving the space utilization rate and reducing the bezel while improving the electrical performance of the display panel.

Specifically, as shown in FIG. 8, FIG. 9, and FIG. 10, it can be seen in (a) in FIG. 10 that the gate layer 312 includes the gate T32G of the first pull-down maintaining transistor T32, the gate T42G of the second pull-down maintaining transistor T42, the gate T52G of the second inverting transistor T52, the gate T53G of the third inverting transistor T53, the gate T54G of the fourth inverting transistor T54, the first electrode plate Cqt1 of the first sub-capacitor Cqt, and the first electrode plate Ckt1 of the second sub-capacitor Ckt. It can be understood that the gate layer further includes gates of other transistors, which are not shown in (a) in FIG. 10.

Specifically, as shown in FIG. 8, FIG. 9, and FIG. 10, it can be seen in (b) in FIG. 10 that the active layer 314 includes an active portion T32A of the first pull-down maintaining transistor T32, an active portion T42A of the second pull-down maintaining transistor T42, an active portion T52A of the second inverting transistor T52, an active portion T53A of the third inverting transistor T53, and an active portion T54A of the fourth inverting transistor T54. It can be understood that the active layer further includes active portions of other transistors, which are not shown in (b) in FIG. 10.

Specifically, it can be understood that the gate of each transistor is disposed corresponding to the active portion of each transistor.

Specifically, as shown in FIG. 8, FIG. 9, and FIG. 11, it can be seen in (a) in FIG. 11 that the source/drain layer 315 includes the first electrode T32S of the first pull-down maintaining transistor T32, the second electrode T32D of the first pull-down maintaining transistor T32, the first electrode T42S of the second pull-down maintaining transistor T42, the second electrode T42D of the second pull-down maintaining transistor T42, the first electrode T52S of the second inverter transistor T52, the second electrode T52D of the second inverting transistor T52, the first electrode T53S of the second inverting transistor T53, the second electrode T53D of the third inverting transistor T53, the first electrode T54S of the fourth inverting transistor T54, the second electrode T54D of the fourth inverting transistor T54, the second electrode plate Cqt2 of the first sub-capacitor Cqt, and the second electrode plate Ckt2 of the second sub-capacitor Ckt. It can be understood that the source/drain layer further includes first electrodes and second electrodes of other transistors, which are not shown in (a) in FIG. 11.

Specifically, as shown in FIG. 8, FIG. 9, and FIG. 11, as can be seen in (b) in FIG. 11, the pixel conductive layer 317 may include a first connection portion K1, a second connection portion K2, a third connection portion K3, and a fourth connection portion K4. The first connection portion K1 passes through a via hole 301 to be connected to the gate T32G of the first pull-down maintaining transistor T32 and the second electrode T53D of the third inverting transistor T53. The second connection portion K2 passes through a via hole 301 to be connected to the second electrode T42D of the second pull-down maintaining transistor T42 and the gate T54G of the fourth inverting transistor T54. The third connection portion K3 passes through a via hole 301 to be connected to the second electrode T52D of the second inverting transistor T52 and the gate T53G of the third inverting transistor T53. The fourth connection portion K4 passes through a via hole 301 to be connected to the first electrode T53S of the fourth inverting transistor T53. It can be understood that the pixel conductive layer further includes other connection portions, which are not shown in (b) in FIG. 11.

Specifically, in the embodiments of the present disclosure, film layers on which the via holes are provided are not limited. It can be understood that positions of the via holes through which different connection portions pass may be different. A same connection portion may pass through a plurality of via holes. The via holes may be via holes connecting the pixel conductive layer to the gate layer, or may be via holes connecting the pixel conductive layer to the source/drain layer.

In some embodiments, as shown in FIGS. 12 to 15, the display panel 1 further includes a pixel conductive layer 317. The pixel conductive layer 317 is disposed on a side of the source/drain layer 315 away from the gate layer 312.

The pixel conductive layer 317 is electrically connected to at least one of the gate of the first pull-down maintaining transistor T32, the gate of the second pull-down maintaining transistor T42, the gate of the second inverting transistor T52, and the gate of the fourth inverting transistor T54. The pixel conductive layer is electrically connected to at least one of the gate of the first pull-down maintaining transistor T32, the gate of the second pull-down maintaining transistor T42, the gate of the second inverting transistor T52, and the gate of the fourth inverting transistor T54, so that the control capability of each transistor can be increased, and the capacitance of the pull-down capacitor can be increased, thereby increasing the pull-down maintain capability.

Specifically, the pixel conductive layer may be electrically connected to at least one of the first node Q and the second node K, so that the pixel conductive layer is equivalent to connecting another capacitor in series with the pull-down capacitor, thereby increasing the pull-down maintainability, improving the control ability of the transistor, and reducing leakage.

Specifically, the pixel conductive layer may be connected to the first node Q. The pixel conductive layer may be connected to the second node K. The pixel conductive layer may include two portions, one portion is connected to the first node Q, and the other portion is connected to the second node K.

Specifically, the pixel conductive layer may be connected to one, two, three, or four of the gate of the first pull-down maintaining transistor T32, the gate of the second pull-down maintaining transistor T42, the gate of the second inverting transistor T52, and the gate of the fourth inverting transistor T54. Under a case where the pixel conductive layer is connected to the gates of a plurality of transistors, a plurality of transparent conductive portions may be disposed to prevent signal crosstalk.

In some embodiments, as shown in FIGS. 12 to 15, the conductive layer 317 includes a first transparent conductive portion 317*a* and a second transparent conductive portion 317*b*. The first transparent conductive portion 317*a* is connected to the gate of the first pull-down maintaining transistor T32 and the gate of the second pull-down maintaining transistor T42. The second transparent conductive portion 317*b* is connected to the gate of the second inverting transistor T52 and the gate of the fourth inverting transistor T54. The pixel conductive layer includes the first transparent conductive portion and the second transparent conductive portion, so that the first transparent conductive portion is connected to the gate of the first pull-down maintaining transistor T32 and the gate of the second pull-down maintaining transistor T42, and the second transparent conductive portion is connected to the gate of the second inverting transistor T52 and the gate of the fourth inverting transistor T54. As such, the capacitances of the first sub-capacitor Cqt and the second sub-capacitor Ckt can be increased, thereby the pull-down maintaining capability can be further improved, and the gate control capability of each transistor can be increased to reduce leakage.

Specifically, as shown in FIGS. 12, 13, and 14, it can be seen in (a) in FIG. 14 that the gate layer 312 includes the gate T32G of the first pull-down maintaining transistor T32, the gate T42G of the second pull-down maintaining transistor T42, the gate T52G of the second inverting transistor T52, the gate T53G of the third inverting transistor T53, the gate T54G of the fourth inverting transistor T54, the first electrode plate Cqt1 of the first sub-capacitor Cqt, and the first electrode plate Ckt1 of the second sub-capacitor Ckt. It can be understood that the gate layer further includes gates of other transistors, which are not shown in (a) in FIG. 14.

Specifically, as shown in FIGS. 12, 13, and 14, it can be seen in (b) in FIG. 14 that the active layer 314 includes the active portion T32A of the first pull-down maintaining transistor T32, the active portion T42A of the second pull-down maintaining transistor T42, the active portion T52A of the second inverting transistor T52, the active portion T53A of the third inverting transistor T53, and the active portion T54A of the fourth inverting transistor T54. It can be understood that the active layer further includes active portions of other transistors, which are not shown in (b) in FIG. 14.

Specifically, it can be understood that the gate of each transistor is disposed corresponding to the active portion of each transistor.

Specifically, as shown in FIGS. 12, 13, and 15, it can be seen in (a) in FIG. 15 that the source/drain layer 315 includes the first electrode T32S of the first pull-down maintaining transistor T32, the second electrode T32D of the first pull-down maintaining transistor T32, the first electrode T42S of the second pull-down maintaining transistor T42, the second electrode T42D of the pull-down maintaining transistor T42, the first electrode T52S of the second inverting transistor T52, the second electrode T52D of the second inverting transistor T52, the first electrode T53S of the third inverting transistor T53, the second electrode T53D of the third inverting transistor T53, the first electrode T54S of the fourth inverting transistor T54, the second electrode T54D of the fourth inverting transistor T54, the second electrode plate Cqt2 of the first sub-capacitor Cqt, and the second electrode plate Ckt2 of the second sub-capacitor Ckt. It can be understood that the source/drain layer further includes first electrodes and second electrodes of other transistors, which are not shown in (a) in FIG. 15.

Specifically, as shown in FIGS. 12, 13, and 15, it can be seen in (b) in FIG. 15 that the pixel conductive layer 317 may include the first transparent conductive portion 317*a*, the second transparent conductive portion 317*b*, the third connection portion K3, and the fourth connection portion K4. The first transparent conductive portion 317*a* passes through the via hole 301 to be connected to the gate T32G of the first pull-down maintaining transistor T32 and the second electrode T53D of the third inverting transistor T53, and a projection of the first transparent conductive portion on the substrate may coincide with projections of the gate of the first pull-down maintaining transistor T32, the gate of the second pull-down maintaining transistor T42, and the second sub-capacitor Ckt on the substrate. The second transparent conductive portion 317*b* passes through the via hole 301 to be connected to the second electrode T42D of the second pull-down maintaining transistor T42 and the gate T54G of the fourth inverting transistor T54, and a projection of the second transparent conductive portion may coincide with projections of the gate of the second inverting transistor T52, the gate of the fourth inverting transistor T54, and the first sub-capacitor Cqt on the substrate. The third connection portion K3 passes through the via hole 301 to be connected to the second electrode T52D of the second inverting transistor T52 and the gate T53G of the third inverting transistor T53. The fourth connection portion K4 passes through the via hole 301 to be connected to the first electrode T53S of the third inverting transistor T53. It can be understood that the pixel conductive layer further includes other connection portions, which are not shown in (b) in FIG. 15.

Specifically, it can be understood that according to different designs of film layers of the display panel, the pixel conductive layer may be disposed in a same layer as the pixel electrode, may be disposed in a same layer as a common electrode, or may be disposed independently.

In some embodiments, as shown in FIGS. 5 to 7, each of the gate driving circuits 21 further includes a pull-up control module 215, a pull-down module 216, a reset module 217, and a storage capacitor Cbt.

The pull-up control module 215 includes a pull-up control transistor T11. A gate of the pull-up control transistor T11 and a first electrode of the pull-up control transistor T11 are configured to receive a pull-up control signal. A second electrode of the pull-up control transistor T11 is electrically connected to the first node Q.

The pull-down module 216 includes a first pull-down transistor T31 and a second pull-down transistor T41. A gate of the first pull-down transistor T31 is configured to receive a first pull-down control signal G(N+4). A first electrode of the first pull-down transistor T31 is electrically connected to the low-potential power supply terminal VSS. A second electrode of the first pull-down transistor T31 is electrically connected to the signal output terminal G(N). A gate of the second pull-down transistor T41 is configured to receive a second pull-down control signal G(N+6). A first electrode of the second pull-down transistor T41 is electrically connected to the low-potential power supply terminal VSS. A second electrode of the second pull-down transistor T41 is electrically connected to the first node Q.

The reset module 217 includes a first reset transistor TrG and a second reset transistor TrQ. A gate of the first reset transistor TrG is connected to a reset signal line Rst. A first electrode of the first reset transistor TrG is electrically connected to the low-potential power supply terminal VSS. A second electrode of the first reset transistor TrG is electrically connected to the signal output terminal G(N). A gate of the second reset transistor TrQ is connected to the reset signal line Rst. A first electrode of the second reset transistor TrQ is electrically connected to the low-potential power supply terminal VSS. A second electrode of the second reset transistor TrQ is electrically connected to the first node Q.

One electrode plate of the storage capacitor Cbt is electrically connected to the first node Q, and the other electrode plate of the storage capacitor Cbt is electrically connected to the signal output terminal G(N).

Specifically, as shown in FIGS. 5 to 7, the pull-up module 211 includes a pull-up transistor T21. A gate of the pull-up transistor T21 is electrically connected to the first node Q. A first electrode of the pull-up transistor T21 is connected to the clock signal line CK. A second electrode of the pull-up transistor T21 is connected to the signal output terminal G(N).

Specifically, the display panel 1 includes the plurality of cascaded gate driving circuits 21. The gate of the pull-up control transistor T11 in a first stage of gate driving circuit 21 may be connected to a start signal line STV, and the gates of the pull-up control transistor T11 in other stages of gate driving circuits 21 may be connected to a signal output terminal G(N−3) of a previous three stage of gate driving circuits 21. N is greater than or equal to 4, and N is an integer.

Specifically, the gate of the first pull-down transistor T31 in the current stage of gate driving circuit may be connected to the signal output terminal G(N+4) in a lower fourth stage of gate driving circuit. The gate of the second pull-down transistor T41 in the current stage of gate driving circuit may be connected to the signal output terminal G(N+6) in a lower sixth stage of gate driving circuit.

Specifically, in the embodiments of the present disclosure, examples are given to illustrate signal lines or signal terminals connected to the gate of each transistor. It can be understood that the embodiments of the present disclosure are not limited thereto. For example, the gate of the first pull-down transistor T31 in the current stage of gate driving circuit may be connected to a signal output terminal G(N+2) in a next two stage of gate driving circuit. Different connection modes may be used when the display is not affected, and the description will not be repeated herein.

Specifically, in the embodiments of the present disclosure, each transistor may be a silicon semiconductor transistor (e.g., a low-temperature polysilicon thin film transistor), thereby reducing power consumption, but the embodiments of the present disclosure are not limited thereto. Each transistor may be an oxide semiconductor transistor (e.g., an indium gallium zinc oxide thin film transistor). Alternatively, some transistors may be silicon semiconductor transistors (e.g., low-temperature polysilicon thin film transistors), and some transistors are oxide semiconductor transistors (e.g. indium gallium zinc oxide thin film transistors).

Specifically, each transistor in the embodiments of the present disclosure may be an N-type transistor.

Specifically, the first electrode may be the source and the second electrode may be the drain. Alternatively, the first electrode is the drain and the second electrode is the source.

Specifically, it can be understood that since the pull-down capacitor is added in the gate driving circuit in the embodiments of the present disclosure, even if various sizes of the pull-down transistor (including a length and a width of its gate, a length and a width of its source, and a length and a width of its drain, etc.) remain unchanged, the ratio of the capacitance of the capacitor formed by the gate and the source of the pull-down transistor to the total capacitance inevitably becomes smaller, thereby reducing leakage.

Specifically, it can be understood that a structure is divided in the above embodiments for a purpose of illustrating a specific design of each structure. It can be understood that a plurality of differently labeled structures are actually a plurality of portions of the structure on which the signals are the same and which can be named by a single label when the effects of impedance, etc., are not taken into account. For example, the first electrode of the first pull-down maintaining transistor T32, the second electrode of the second pull-down maintaining transistor T42, and the second electrode of the second sub-capacitor Ckt are actually three parts of the structure. The first branch electrode and the second branch electrode are divided from parts of the structure corresponding to the first pull-down maintaining transistor T32. The above mentioned structure transmits the same signals, which can be labeled with the same labeling number. Similarly, other similar designs can be described above.

Specifically, the above embodiments describe some embodiments of the display panel from the aspects of circuits, film layers, etc. It can be understood that as long as there is no conflict between the embodiments, the embodiments may be combined, split, or split after split. For example, the first electrode plate of the pull-down capacitor 214 is electrically connected to the second node K. The second electrode plate of the pull-down capacitor 214 is electrically connected to the low-potential power supply terminal VSS. The pull-down module 212 includes the first pull-down transistor T32 and the second pull-down transistor T42. The gate of the first pull-down maintaining transistor T32 is electrically connected to the second node K. The first electrode of the first pull-down maintaining transistor T32 is electrically connected to the low-potential power supply terminal VSS. The second electrode of the first pull-down maintaining transistor T32 is electrically connected to the signal output terminal G(N). The gate of the first pull-down maintaining transistor T42 is electrically connected to the second node K. The first electrode of the second pull-down maintaining transistor T42 is electrically connected to the low-potential power supply terminal VSS. The second electrode of the second pull-down maintaining transistor T42 is electrically connected to the first node Q. The first electrode plate of the pull-down capacitor 214 is electrically connected to the gate of the first pull-down maintaining transistor T32 and the gate of the second pull-down maintaining transistor T42. Alternatively, the first electrode plate of the pull-down capacitor 214 is electrically connected to the second node K, and the second electrode plate of the pull-down capacitor 214 is electrically connected to the low-potential power supply terminal VSS. The display panel 1 includes the substrate 311, the gate layer 312, and the source/drain layer 315. The gate layer 312 is disposed on one side of the substrate 311. The gate layer 312 includes the gate of the first pull-down maintaining transistor T32, the gate of the second pull-down maintaining transistor T42, and the first electrode plate of the pull-down capacitor. The source/drain layer 315 is disposed on the side of the gate layer 312 away from the substrate 311. The source/drain layer 315 includes the first electrode of the first pull-down maintaining transistor T32, the first electrode of the second pull-down maintaining transistor T42, and the second electrode plate of the pull-down capacitor 214. The gate of the first pull-down maintaining transistor T32 and the gate of the second pull-down maintaining transistor T42 are connected to the first electrode plate of the pull-down capacitor. The first electrode of the first pull-down maintaining transistor T32 and the first electrode of the second pull-down maintaining transistor T42 are connected to the second electrode plate of the pull-down capacitor 214.

Meanwhile, a display device is provided by the embodiments of the present disclosure. The display device includes the display panel as described in any of the above-described embodiments.

In the description of the present disclosure, it is to be understood that the terms “first”, “second” and the like are used for descriptive purposes only and are not to be construed as indicating or implying relative importance or implying an amount of indicated technical features. Thus, features defined with “first” and “second” may explicitly or implicitly include one or more features. In the present disclosure, the term “plurality” means two or more than two, unless explicitly defined otherwise.

In the above-described embodiments, the description of each embodiment has its own emphasis, and for parts not described in detail in a certain embodiment, please refer to the related description of other embodiments.

The embodiments, implementations and related technical features of the present disclosure can be combined and replaced with each other without conflict.

What described above are only preferred embodiments of the present disclosure and are not intended to limit the present disclosure in any form. Any simple modification, equivalent change and embellishment to the above embodiments based on the technical essence of the present disclosure without departing from the content of the technical proposals of the present disclosure still fall within the scope of the technical proposals of the present disclosure.

What is claimed is:

1. A display panel, comprising a plurality of gate driving circuits in a cascaded configuration, wherein each of the plurality of gate driving circuits comprises:

a pull-up module electrically connected to a first node, wherein the pull-up module is configured, according to a potential of the first node, to connect a clock signal line to a signal output terminal of a current stage of gate driving circuit, or to disconnect an electrical connection between the clock signal line and the signal output terminal;

a pull-down maintaining module electrically connected to the first node and a low-potential power supply terminal;

an inverting module, wherein one end of the inverting module is electrically connected directly to the first node, the other end of the inverting module is electrically connected directly to the pull-down maintaining module at a second node, and the inverting module is configured, according to the potential of the first node, for controlling the pull-down maintaining module to connect the low-potential power supply terminal with the first node, or to disconnect an electrical connection between the low-potential power supply terminal and the first node; and a pull-down capacitor, wherein at least one of the first node and the second node is electrically connected directly to a first electrode plate of the pull-down capacitor, and a second electrode plate of the pull-down capacitor is electrically connected directly to the low-potential power supply terminal.

2. The display panel according to claim 1, wherein the first electrode plate of the pull-down capacitor is electrically connected to the second node, and the second electrode plate of the pull-down capacitor is electrically connected to the low-potential power supply terminal.

3. The display panel according to claim 1, wherein the first electrode plate of the pull-down capacitor is electrically connected to the first node, and the second electrode plate of the pull-down capacitor is electrically connected to the low-potential power supply terminal.

4. The display panel according to claim 1, wherein the pull-down capacitor comprises a first sub-capacitor and a second sub-capacitor, a first electrode plate of the first sub-capacitor is electrically connected to the first node, a second electrode plate of the first sub-capacitor is electrically connected to the low-potential power supply terminal, a first electrode plate of the second sub-capacitor is electrically connected to the second node, and a second electrode plate of the second sub-capacitor is electrically connected to the low-potential power supply terminal.

5. The display panel according to claim 4, wherein the pull-down maintaining module comprises:

a first pull-down maintaining transistor, wherein a gate of the first pull-down maintaining transistor is electrically connected to the second node, a first electrode of the first pull-down maintaining transistor is electrically connected to the low-potential power supply terminal, and a second electrode of the first pull-down maintaining transistor is electrically connected to the signal output terminal; and a second pull-down maintaining transistor, wherein a gate of the second pull-down maintaining transistor is electrically connected to the second node, a first electrode of the second pull-down maintaining transistor is electrically connected to the low-potential power supply terminal, and a second electrode of the second pull-down maintaining transistor is electrically connected to the first node;

wherein the first electrode plate of the second sub-capacitor is electrically connected to the gate of the first pull-down maintaining transistor and the gate of the second pull-down maintaining transistor.

6. The display panel according to claim 5, wherein the inverting module comprises:

a first inverting transistor, wherein a gate of the first inverting transistor is electrically connected to a high-potential power supply terminal, and a first electrode of the first inverting transistor is electrically connected to the high-potential power supply terminal;

a second inverting transistor, wherein a gate of the second inverting transistor is electrically connected to the first node, a first electrode of the second inverting transistor is electrically connected to the low-potential power supply terminal, and a second electrode of the second inverting transistor is electrically connected to a second electrode of the first inverting transistor at a third node;

a third inverting transistor, wherein a gate of the third inverting transistor is electrically connected to the second electrode of the first inverting transistor at the third node, a first electrode of the third inverting transistor is electrically connected to the high-potential power supply terminal, and a second electrode of the third inverting transistor is electrically connected to the pull-down maintaining module at the second node; and a fourth inverting transistor, wherein a gate of the fourth inverting transistor is electrically connected to the first node, a first electrode of the fourth inverting transistor is electrically connected to the low-potential power supply terminal, and a second electrode of the fourth inverting transistor is electrically connected to the second node;

wherein the first electrode plate of the first sub-capacitor is electrically connected to the gate of the second inverting transistor and the gate of the fourth inverting transistor.

7. The display panel according to claim 6, further comprising:

a substrate;

a gate layer disposed on a side of the substrate, wherein the gate layer comprises the gate of the first pull-down maintaining transistor, the gate of the second pull-down maintaining transistor, the gate of the second inverting transistor, the gate of the fourth inverting transistor, the first electrode plate of the first sub-capacitor, and the first electrode plate of the second sub-capacitor; and a source/drain layer disposed on a side of the gate layer away from the substrate, wherein the source/drain layer comprises the first electrode of the first pull-down maintaining transistor, the first electrode of the second pull-down maintaining transistor, the first electrode of the second inverting transistor, the first electrode of the fourth inverting transistor, the second electrode plate of the first sub-capacitor, and the second electrode plate of the second sub-capacitor;

wherein the gate of the first pull-down maintaining transistor and the gate of the second pull-down maintaining transistor are connected to the first electrode plate of the second sub-capacitor, and the first electrode of the first pull-down maintaining transistor and the first electrode of the second pull-down maintaining transistor are connected to the second electrode plate of the second sub-capacitor; and/or wherein the gate of the second inverting transistor and the gate of the fourth inverting transistor are connected to the first electrode plate of the first sub-capacitor, and the first electrode of the second inverting transistor and the first electrode of the fourth inverting transistor are connected to the second electrode plate of the first sub-capacitor.

8. The display panel according to claim 7, further comprising:

a pixel conductive layer disposed on a side of the source/drain layer away from the gate layer;

wherein the pixel conductive layer is electrically connected to at least one of the gate of the first pull-down maintaining transistor, the gate of the second pull-down maintaining transistor, the gate of the second inverting transistor, and the gate of the fourth inverting transistor.

9. The display panel according to claim 8, wherein the pixel conductive layer comprises a first transparent conductive portion and a second transparent conductive portion, the first transparent conductive portion is connected to the gate of the first pull-down maintaining transistor and the gate of the second pull-down maintaining transistor, and the second transparent conductive portion is connected to the gate of the second inverting transistor and the gate of the fourth inverting transistor.

10. The display panel according to claim 6, wherein the second electrode plate of the first sub-capacitor is located between the first electrode of the second inverting transistor and the first electrode of the fourth inverting transistor.

11. The display panel according to claim 5, wherein the first electrode of the first pull-down maintaining transistor comprises a first branch electrode and a second branch electrode, the first branch electrode and the second branch electrode are arranged along a first direction, a length of the first branch electrode along a second direction is greater than a length of the second branch electrode along the second direction, and the second electrode plate of the second sub-capacitor and a part of the first branch electrode extending beyond the second branch electrode are arranged along the first direction; and wherein in the second direction, the second electrode plate of the second sub-capacitor is located between the second branch electrode and the first electrode of the second pull-down maintaining transistor, and an included angle between the first direction and the second direction is greater than 0 degrees and less than or equal to 90 degrees.

12. The display panel according to claim 1, wherein each of the plurality of gate driving circuits comprises:

a pull-up control module comprising a pull-up control transistor, wherein a gate of the pull-up control transistor and a first electrode of the pull-up control transistor are configured to receive a pull-up control signal, and a second electrode of the pull-up control transistor is electrically connected to the first node;

a pull-down module comprising a first pull-down transistor and a second pull-down transistor, wherein a gate of the first pull-down transistor is configured to receive a first pull-down control signal, a first electrode of the first pull-down transistor is electrically connected to the low-potential power supply terminal, a second electrode of the first pull-down transistor is electrically connected to the signal output terminal, a gate of the second pull-down transistor is configured to receive a second pull-down control signal, a first electrode of the second pull-down transistor is electrically connected to the low-potential power supply terminal, and a second electrode of the second pull-down transistor is electrically connected to the first node;

a reset module comprising a first reset transistor and a second reset transistor, wherein a gate of the first reset transistor is connected to a reset signal line, a first electrode of the first reset transistor is electrically connected to the low-potential power supply terminal, a second electrode of the first reset transistor is electrically connected to the signal output terminal, a gate of the second reset transistor is connected to the reset signal line, a first electrode of the second reset transistor is electrically connected to the low-potential power supply terminal, and a second electrode of the second reset transistor is electrically connected to the first node; and a storage capacitor, wherein one electrode plate of the storage capacitor is electrically connected to the first node, and the other electrode plate of the storage capacitor is electrically connected to the signal output terminal.

13. A display device, comprising a display panel, wherein the display panel comprises a plurality of gate driving circuits in a cascaded configuration, and each of the plurality of gate driving circuits comprises:

a pull-up module electrically connected to a first node, wherein the pull-up module is configured, according to a potential of the first node, to connect a clock signal line to a signal output terminal of a current stage of gate driving circuit, or to disconnect an electrical connection between the clock signal line and the signal output terminal;

a pull-down maintaining module electrically connected to the first node and a low-potential power supply terminal;

an inverting module, wherein one end of the inverting module is electrically connected directly to the first node, the other end of the inverting module is electrically connected directly to the pull-down maintaining module at a second node, and the inverting module is configured, according to the potential of the first node, for controlling the pull-down maintaining module to connect the low-potential power supply terminal with the first node, or to disconnect an electrical connection between the low-potential power supply terminal and the first node; and a pull-down capacitor, wherein at least one of the first node and the second node is electrically connected directly to a first electrode plate of the pull-down capacitor, and a second electrode plate of the pull-down capacitor is electrically connected directly to the low-potential power supply terminal.

14. The display device according to claim 13, wherein the first electrode plate of the pull-down capacitor is electrically connected to the second node, and the second electrode plate of the pull-down capacitor is electrically connected to the low-potential power supply terminal.

15. The display device according to claim 13, wherein the first electrode plate of the pull-down capacitor is electrically connected to the first node, and the second electrode plate of the pull-down capacitor is electrically connected to the low-potential power supply terminal.

16. The display device according to claim 13, wherein the pull-down capacitor comprises a first sub-capacitor and a second sub-capacitor, a first electrode plate of the first sub-capacitor is electrically connected to the first node, a second electrode plate of the first sub-capacitor is electrically connected to the low-potential power supply terminal, a first electrode plate of the second sub-capacitor is electrically connected to the second node, and a second electrode plate of the second sub-capacitor is electrically connected to the low-potential power supply terminal.

17. The display device according to claim 16, wherein the pull-down maintaining module comprises:

a first pull-down maintaining transistor, wherein a gate of the first pull-down maintaining transistor is electrically connected to the second node, a first electrode of the first pull-down maintaining transistor is electrically connected to the low-potential power supply terminal, and a second electrode of the first pull-down maintaining transistor is electrically connected to the signal output terminal; and a second pull-down maintaining transistor, wherein a gate of the second pull-down maintaining transistor is electrically connected to the second node, a first electrode of the second pull-down maintaining transistor is electrically connected to the low-potential power supply terminal, and a second electrode of the second pull-down maintaining transistor is electrically connected to the first node;

wherein the first electrode plate of the second sub-capacitor is electrically connected to the gate of the first pull-down maintaining transistor and the gate of the second pull-down maintaining transistor.

18. The display device according to claim 17, wherein the inverting module comprises:

a first inverting transistor, wherein a gate of the first inverting transistor is electrically connected to a high-potential power supply terminal, and a first electrode of the first inverting transistor is electrically connected to the high-potential power supply terminal;

a second inverting transistor, wherein a gate of the second inverting transistor is electrically connected to the first node, a first electrode of the second inverting transistor is electrically connected to the low-potential power supply terminal, and a second electrode of the second inverting transistor is electrically connected to a second electrode of the first inverting transistor at a third node;

a third inverting transistor, wherein a gate of the third inverting transistor is electrically connected to the second electrode of the first inverting transistor at the third node, a first electrode of the third inverting transistor is electrically connected to the high-potential power supply terminal, and a second electrode of the third inverting transistor is electrically connected to the pull-down maintaining module at the second node; and a fourth inverting transistor, wherein a gate of the fourth inverting transistor is electrically connected to the first node, a first electrode of the fourth inverting transistor is electrically connected to the low-potential power supply terminal, and a second electrode of the fourth inverting transistor is electrically connected to the second node;

wherein the first electrode plate of the first sub-capacitor is electrically connected to the gate of the second inverting transistor and the gate of the fourth inverting transistor.

19. The display device according to claim 18, wherein the display panel further comprises:

a substrate;

a gate layer disposed on a side of the substrate, wherein the gate layer comprises the gate of the first pull-down maintaining transistor, the gate of the second pull-down maintaining transistor, the gate of the second inverting transistor, the gate of the fourth inverting transistor, the first electrode plate of the first sub-capacitor, and the first electrode plate of the second sub-capacitor; and a source/drain layer disposed on a side of the gate layer away from the substrate, wherein the source/drain layer comprises the first electrode of the first pull-down maintaining transistor, the first electrode of the second pull-down maintaining transistor, the first electrode of the second inverting transistor, the first electrode of the fourth inverting transistor, the second electrode plate of the first sub-capacitor, and the second electrode plate of the second sub-capacitor;

wherein the gate of the first pull-down maintaining transistor and the gate of the second pull-down maintaining transistor are connected to the first electrode plate of the second sub-capacitor, and the first electrode of the first pull-down maintaining transistor and the first electrode of the second pull-down maintaining transistor are connected to the second electrode plate of the second sub-capacitor; and/or wherein the gate of the second inverting transistor and the gate of the fourth inverting transistor are connected to the first electrode plate of the first sub-capacitor, and the first electrode of the second inverting transistor and the first electrode of the fourth inverting transistor are connected to the second electrode plate of the first sub-capacitor.

20. The display device according to claim 17, wherein the first electrode of the first pull-down maintaining transistor comprises a first branch electrode and a second branch electrode, the first branch electrode and the second branch electrode are arranged along a first direction, a length of the first branch electrode along a second direction is greater than a length of the second branch electrode along the second direction, and the second electrode plate of the second sub-capacitor and a part of the first branch electrode extending beyond the second branch electrode are arranged along the first direction; and wherein in the second direction, the second electrode plate of the second sub-capacitor is located between the second branch electrode and the first electrode of the second pull-down maintaining transistor, and an included angle between the first direction and the second direction is greater than 0 degrees and less than or equal to 90 degrees.

* * * * *